(12) United States Patent
Huang et al.

(10) Patent No.: US 10,263,901 B2
(45) Date of Patent: Apr. 16, 2019

(54) SERVICE PACKET PROCESSING METHOD, APPARATUS, AND SYSTEM

(71) Applicant: Huawei Technologies Co., Ltd., Shenzhen (CN)

(72) Inventors: Yong Huang, Shenzhen (CN); Hengjun Zhu, Shenzhen (CN); Lehong Niu, Shenzhen (CN); Jinchun Xu, Shenzhen (CN); Xuhui Bai, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 81 days.

(21) Appl. No.: 14/832,835

(22) Filed: Aug. 21, 2015

(65) Prior Publication Data
US 2015/0365331 A1    Dec. 17, 2015

Related U.S. Application Data

(63) Continuation of application No. PCT/CN2014/071897, filed on Feb. 8, 2014.

(30) Foreign Application Priority Data

Feb. 22, 2013    (CN) .......................... 2013 1 0057650

(51) Int. Cl.
*H04L 12/851*    (2013.01)
*H04L 12/741*    (2013.01)
(Continued)

(52) U.S. Cl.
CPC ...... *H04L 47/2441* (2013.01); *H04L 41/5019* (2013.01); *H04L 41/5077* (2013.01);
(Continued)

(58) Field of Classification Search
None
See application file for complete search history.

(56) References Cited

U.S. PATENT DOCUMENTS

2005/0289244 A1    12/2005   Sahu et al.
2006/0198321 A1*   9/2006    Nadeau ................... H04L 43/50
                                                               370/254
(Continued)

FOREIGN PATENT DOCUMENTS

CN    101272317    9/2008
CN    101459575    6/2009
(Continued)

*Primary Examiner* — Adnan Baig
(74) *Attorney, Agent, or Firm* — Slater Matsil, LLP

(57) ABSTRACT

The present invention discloses a service packet processing method, apparatus, and system. The method includes a first service atom receiving a second packet sent by a central switching device, where a first service packet is encapsulated in the second packet and the second packet further includes a first service path identifier. The first service atom performs first service processing according to information in the first service packet, to obtain a first processing result. The first service atom queries a first path switching entry according to the first processing result and the first service path identifier. The first service atom sends a third packet to the central switching device, where a source device identifier of the third packet is a device identifier of the first service atom, a second service packet is encapsulated in the third packet, and the third packet includes the second service path identifier.

17 Claims, 18 Drawing Sheets

(51) Int. Cl.
   *H04L 12/24* (2006.01)
   *H04L 12/721* (2013.01)
   *H04L 12/717* (2013.01)

(52) U.S. Cl.
   CPC .............. *H04L 45/74* (2013.01); *H04L 45/42* (2013.01); *H04L 45/72* (2013.01)

(56) References Cited

U.S. PATENT DOCUMENTS

| | | | |
|---|---|---|---|
| 2011/0128975 A1* | 6/2011 | Kang | H04L 65/605 370/477 |
| 2011/0228778 A1 | 9/2011 | Dyke et al. | |
| 2012/0027016 A1 | 2/2012 | Filsfils et al. | |
| 2013/0259472 A1* | 10/2013 | Gebhard | H04L 45/38 398/45 |
| 2014/0029618 A1* | 1/2014 | Janardhanan | H04L 45/586 370/392 |

FOREIGN PATENT DOCUMENTS

| | | |
|---|---|---|
| CN | 101557297 | 10/2009 |
| CN | 102404192 | 4/2012 |
| EP | 2418825 | 2/2012 |
| EP | 2993836 A1 | 3/2016 |
| WO | 2012084462 | 6/2012 |

* cited by examiner

SERVICE PACKET PROCESSING METHOD, APPARATUS, AND SYSTEM

This application is a continuation of International Application No. PCT/CN2014/071897, filed on Feb. 8, 2014, which claims priority to Chinese Patent Application No. 201310057650.5, filed on Feb. 22, 2013, both of which are hereby incorporated by reference in their entireties.

TECHNICAL FIELD

The present invention relates to the field of Internet technologies, and in particular, to a service packet processing method, apparatus, and system.

BACKGROUND

With the rapid development of Internet technologies, the Internet can provide increasingly abundant service types for users, and service logic also becomes increasingly complex. When a service processing machine is deployed, a method that is commonly used is correspondingly allocating one service processing machine or allocating one processing module of a service processing machine to each complete service. However, this manner of deploying a service processing machine causes a relatively great waste of resources.

In order to improve a utilization rate of a system resource, a service atom starts to be used. Any complex service may be formed by multiple basic and simple services. One service processing machine or one processing module of a service processing machine may be allocated to each basic service. The service processing machine or processing module allocated to the basic service is known as a service atom. Service atoms are connected by using a network to constitute a service processing system. In this way, for a different service, a combination of required service atoms can be allocated to the service in the service processing system according to basic services that form the service. In addition, corresponding service packets are sent between the service atoms (known as service routing) according to a corresponding sequence, so as to execute processing of each basic service, and finally implement complete service processing. In this manner, a service processing system is formed by a few service atoms, which can implement processing of a great variety of services.

In a process of implementing the present invention, the inventors find that the prior art has at least the following problems.

In the prior art, a service processing system formed by service atoms determines in advance a service path for transmitting a service packet in the service processing system (the service path is a path formed by connecting multiple service atoms in series and indicating a service processing sequence). The service packet can only pass through, according to the predetermined service path, service atoms on the service path sequentially. In this way, processing can be performed only on a chain-type service, and a target service atom of a service packet can only be determined regardless of which service atom the service packet is located in, which imposes a relatively large limitation on a scope of a service that can be processed by the service processing system.

SUMMARY

Embodiments of the present invention provide a service packet processing method, apparatus, and system.

According to a first aspect, a service packet processing method is provided and is applied to a service processing system, where the method includes the following steps. Receiving, by a traffic classification device, a first service packet, and acquiring, by the traffic classification device, a first service identifier, where the first service identifier is a service identifier of the first service packet. The method also includes querying, by the traffic classification device, a first traffic classification entry according to the first service identifier, so as to acquire a first service path identifier, where the first traffic classification entry includes a correspondence between the first service identifier and the first service path identifier. The method also includes encapsulating, by the traffic classification device, the first service packet to obtain a first packet, where the first packet includes the first service path identifier and a source device identifier of the first packet, and the source device identifier of the first packet includes a device identifier of the traffic classification device; and sending, by the traffic classification device, the first packet to a central switching device.

According to a second aspect, a service packet processing method is provided, where the method includes receiving, by a traffic classification device, a first service packet; and acquiring, by the traffic classification device, a first service identifier, where the first service identifier is a service identifier of the first service packet. The method also includes querying, by the traffic classification device, a first traffic classification entry according to the first service identifier, so as to acquire a first service path identifier and a device identifier of a first service atom, where the first traffic classification entry includes a correspondence between the first service identifier, the first service path identifier, and the device identifier of the first service atom, and encapsulating, by the traffic classification device, the first service packet to obtain a first packet, where the first packet includes the first service path identifier and a source device identifier of the first packet, and the source device identifier of the first packet includes a device identifier of the traffic classification device. The method also includes sending, by the traffic classification device, the first packet to the first service atom.

According to a third aspect, a service packet processing method is provided and is applied to a service processing system, where the method includes receiving, by a central switching device, a first packet, where a first service packet is encapsulated in the first packet, and the first packet includes a first service path identifier and a source device identifier of the first packet. The method also includes querying, by the central switching device, a first service route forwarding entry according to the source device identifier of the first packet and the first service path identifier, so as to acquire a device identifier of a first service atom, where the first service route forwarding entry includes a correspondence between the source device identifier of the first packet, the first service path identifier, and the device identifier of the first service atom. The method also includes sending, by the central switching device, a second packet to the first service atom, where the first service packet is encapsulated in the second packet and the second packet further includes the first service path identifier.

A first implementation manner of the third aspect is based on the third aspect. In the first implementation manner of the third aspect, the source device identifier of the first packet includes a device identifier of a traffic classification device, or the source device identifier of the first packet includes a device identifier of a service atom.

A second implementation manner of the third aspect is based on the third aspect or the first implementation manner of the third aspect. In the second implementation manner of the third aspect, the method further includes receiving, by the central switching device, a third packet sent by the first service atom, where the third packet includes a second service path identifier and a second service packet is further encapsulated in the third packet, where the second service packet includes a part of a payload of the first service packet, all of a payload of the first service packet, or the first service packet. The method also includes querying, by the central switching device, a second service route forwarding entry according to the second service path identifier and a source device identifier of the third packet, so as to acquire a device identifier of a second service atom, where the second service route forwarding entry includes a correspondence between the source device identifier of the third packet, the second service path identifier, and the device identifier of the second service atom. The method also includes sending, by the central switching device, a fourth packet to the second service atom, where the second service packet is encapsulated in the fourth packet and the fourth packet further includes the second service path identifier.

According to a fourth aspect, a service packet processing method is provided and is applied to a service processing system. The method includes receiving, by a first service atom, a second packet sent by a central switching device, where a first service packet is encapsulated in the second packet and the second packet further includes a first service path identifier. The method also includes performing, by the first service atom, first service processing according to information in the first service packet, to obtain a first processing result, and querying, by the first service atom, a first path switching entry according to the first processing result and the first service path identifier, so as to acquire a second service path identifier, where the first path switching entry includes a correspondence between the first processing result, the first service path identifier, and the second service path identifier. The method also includes sending, by the first service atom, a third packet to the central switching device, where a source device identifier of the third packet is a device identifier of the first service atom, a second service packet is encapsulated in the third packet, and the third packet includes the second service path identifier, where the second service packet includes a part of a payload of the first service packet, all of a payload of the first service packet, or the first service packet.

According to a fifth aspect, a service packet processing method is provided and is applied to a service processing system. The method includes receiving, by a first service atom, a first packet, where a first service packet is encapsulated in the first packet and the first packet further includes a first service path identifier, and performing, by the first service atom, first service processing according to information in the first service packet, to obtain a first processing result. The method also includes querying, by the first service atom, a first path switching entry according to a source device identifier of the first packet, the first processing result, and the first service path identifier, so as to acquire a second service path identifier and a device identifier of a second service atom, where the first path switching entry includes a correspondence between the source device identifier of the first packet, the first processing result, the first service path identifier, the second service path identifier, and the device identifier of the second service atom. The method also includes sending, by the first service atom, a second packet to the second service atom, where a source device identifier of the second packet is a device identifier of the first service atom, a second service packet is encapsulated in the second packet, and the second packet includes the second service path identifier, where the second service packet includes a part of a payload of the first service packet, all of a payload of the first service packet, or the first service packet.

According to a sixth aspect, a traffic classification device is provided and is applied to a service processing system, where the traffic classification device includes a receiving module, configured to receive a first service packet, and an acquiring module, configured to acquire a first service identifier, where the first service identifier is a service identifier of the first service packet. The device also includes a querying module, configured to query a first traffic classification entry according to the first service identifier, so as to acquire a first service path identifier, where the first traffic classification entry includes a correspondence between the first service identifier and the first service path identifier. The device also includes an encapsulating module, configured to encapsulate the first service packet to obtain a first packet, where the first packet includes the first service path identifier and a source device identifier of the first packet, and the source device identifier of the first packet includes a device identifier of the traffic classification device. The device also includes a sending module, configured to send the first packet to a central switching device.

According to a seventh aspect, a traffic classification device is provided and is applied to a service processing system, where the traffic classification device includes: a receiving module, configured to receive a first service packet; an acquiring module, configured to acquire a first service identifier, where the first service identifier is a service identifier of the first service packet, and a querying module, configured to query a first traffic classification entry according to the first service identifier, so as to acquire a first service path identifier and a device identifier of a first service atom, where the first traffic classification entry includes a correspondence between the first service identifier, the first service path identifier, and the device identifier of the first service atom. The device also includes an encapsulating module, configured to encapsulate the first service packet to obtain a first packet, where the first packet includes the first service path identifier and a source device identifier of the first packet, and the source device identifier of the first packet includes a device identifier of the traffic classification device. The device also includes a sending module, configured to send the first packet to the first service atom.

According to an eighth aspect, a central switching device is provided and is applied to a service processing system. The central switching device includes: a receiving module, configured to receive a first packet, where a first service packet is encapsulated in the first packet, and the first packet includes a first service path identifier and a source device identifier of the first packet. The device also includes a querying module, configured to query a first service route forwarding entry according to the source device identifier of the first packet and the first service path identifier, so as to acquire a device identifier of a first service atom, where the first service route forwarding entry includes a correspondence between the source device identifier of the first packet, the first service path identifier, and the device identifier of the first service atom. The device also includes a sending module, configured to send a second packet to the first service atom, where the first service packet is encapsulated in the second packet and the second packet further includes the first service path identifier.

A first implementation manner of the eighth aspect is based on the eighth aspect. In the first implementation manner of the eighth aspect, the source device identifier of the first packet includes a device identifier of a traffic classification device, or the source device identifier of the first packet includes a device identifier of a service atom.

A second implementation manner of the eighth aspect is based on the eighth aspect or the first implementation manner of the eighth aspect. In the second implementation manner of the eighth aspect, the receiving module is further configured to receive a third packet sent by the first service atom, where the third packet includes a second service path identifier and a second service packet is further encapsulated in the third packet, where the second service packet includes a part of a payload of the first service packet, all of a payload of the first service packet, or the first service packet. The querying module is further configured to query a second service route forwarding entry according to the second service path identifier and a source device identifier of the third packet, so as to acquire a device identifier of a second service atom, where the second service route forwarding entry includes a correspondence between the source device identifier of the third packet, the second service path identifier, and the device identifier of the second service atom. The sending module is further configured to send a fourth packet to the second service atom, where the second service packet is encapsulated in the fourth packet and the fourth packet further includes the second service path identifier.

According to a ninth aspect, a first service atom is provided and is applied to a service processing system. The first service atom includes a receiving module, configured to receive a second packet sent by a central switching device, where a first service packet is encapsulated in the second packet and the second packet further includes a first service path identifier; a processing module, configured to perform first service processing according to information in the first service packet, to obtain a first processing result; a querying module, configured to query a first path switching entry according to the first processing result and the first service path identifier, so as to acquire a second service path identifier, where the first path switching entry includes a correspondence between the first processing result, the first service path identifier, and the second service path identifier; and a sending module, configured to send a third packet to the central switching device, where a source device identifier of the third packet is a device identifier of the first service atom, a second service packet is encapsulated in the third packet, and the third packet includes the second service path identifier, where the second service packet includes a part of a payload of the first service packet, all of a payload of the first service packet, or the first service packet.

According to a tenth aspect, a first service atom is provided and is applied to a service processing system. The first service atom includes: a receiving module, configured to receive a first packet, where a first service packet is encapsulated in the first packet and the first packet further includes a first service path identifier; a processing module, configured to perform first service processing according to information in the first service packet, to obtain a first processing result; a querying module, configured to query a first path switching entry according to a source device identifier of the first packet, the first processing result, and the first service path identifier, so as to acquire a second service path identifier and a device identifier of a second service atom, where the first path switching entry includes a correspondence between the source device identifier of the first packet, the first processing result, the first service path identifier, the second service path identifier, and the device identifier of the second service atom; and a sending module, configured to send a second packet to the second service atom, where a source device identifier of the second packet is a device identifier of the first service atom, a second service packet is encapsulated in the second packet, and the second packet includes the second service path identifier, where the second service packet includes a part of a payload of the first service packet, all of a payload of the first service packet, or the first service packet.

According to an eleventh aspect, a service processing system is provided, where the service processing system includes a traffic classification device, a central switching device, and at least one service atom. The traffic classification device is configured to receive a first service packet; and acquire a first service identifier, where the first service identifier is a service identifier of the first service packet; query a first traffic classification entry according to the first service identifier, so as to acquire a first service path identifier, where the first traffic classification entry includes a correspondence between the first service identifier and the first service path identifier; encapsulate the first service packet to obtain a first packet, where the first packet includes the first service path identifier and a source device identifier of the first packet, and the source device identifier of the first packet includes a device identifier of the traffic classification device; and send the first packet to the central switching device; the central switching device is configured to receive the first packet, where the first service packet is encapsulated in the first packet, and the first packet includes the first service path identifier and the source device identifier of the first packet; query a first service route forwarding entry according to the source device identifier of the first packet and the first service path identifier, so as to acquire a device identifier of a first service atom, where the first service route forwarding entry includes s a correspondence between the source device identifier of the first packet, the first service path identifier, and the device identifier of the first service atom; and send a second packet to the first service atom, where the first service packet is encapsulated in the second packet and the second packet further includes the first service path identifier; the first service atom is configured to receive the second packet sent by the central switching device, where the first service packet is encapsulated in the second packet and the second packet further includes the first service path identifier; perform first service processing according to information in the first service packet, to obtain a first processing result; query a first path switching entry according to the first processing result and the first service path identifier, so as to acquire a second service path identifier, where the first path switching entry includes a correspondence between the first processing result, the first service path identifier, and the second service path identifier; and send a third packet to the central switching device, where a source device identifier of the third packet is the device identifier of the first service atom, a second service packet is encapsulated in the third packet, and the third packet includes the second service path identifier, where the second service packet includes a part of a payload of the first service packet, all of a payload of the first service packet, or the first service packet.

A first implementation manner of the eleventh aspect is based on the eleventh aspect. In the first implementation manner of the eleventh aspect, the central switching device is further configured to: receive the third packet sent by the first service atom, where the third packet includes the second service path identifier and the second service packet is further encapsulated in the third packet; query a second service route forwarding entry according to the second service path identifier and the source device identifier of the third packet, so as to acquire a device identifier of a second service atom, where the second service route forwarding entry includes a correspondence between the source device identifier of the third packet, the second service path identifier, and the device identifier of the second service atom; and send a fourth packet to the second service atom, where the second service packet is encapsulated in the fourth packet and the fourth packet further includes the second service path identifier.

According to a twelfth aspect, a service processing system is provided, where the service processing system includes a traffic classification device and at least one service atom, where: the traffic classification device is configured to receive a first service packet; acquire a first service identifier, where the first service identifier is a service identifier of the first service packet; query a first traffic classification entry according to the first service identifier, so as to acquire a first service path identifier and a device identifier of a first service atom, where the first traffic classification entry includes a correspondence between the first service identifier, the first service path identifier, and the device identifier of the first service atom; encapsulate the first service packet to obtain a first packet, where the first packet includes the first service path identifier and a source device identifier of the first packet, and the source device identifier of the first packet includes a device identifier of the traffic classification device; and send the first packet to the first service atom; and the first service atom is configured to receive the first packet, where the first service packet is encapsulated in the first packet and the first packet further includes the first service path identifier; perform first service processing according to information in the first service packet, to obtain a first processing result; query a first path switching entry according to the source device identifier of the first packet, the first processing result, and the first service path identifier, so as to acquire a second service path identifier and a device identifier of a second service atom, where the first path switching entry includes a correspondence between the source device identifier of the first packet, the first processing result, the first service path identifier, the second service path identifier, and the device identifier of the second service atom; and send a second packet to the second service atom, where a source device identifier of the second packet is the device identifier of the first service atom, a second service packet is encapsulated in the second packet, and the second packet includes the second service path identifier, where the second service packet includes a part of a payload of the first service packet, all of a payload of the first service packet, or the first service packet.

Beneficial effects brought by the technical solutions in the embodiments of the present invention include the following effects.

In the embodiments of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

The embodiments of the present invention provide a service packet processing method that is applied to a service processing system. The service processing system may include a traffic classification device and at least one service atom, may further include at least one egress device, may further include a central switching device, and in addition, may further include a control device. The traffic classification device may be used as an ingress of the service processing system, and is configured to receive a service packet sent to the service processing system and forward the service packet to another device inside the service processing system. The egress device is an egress of the service processing system, and is configured to send (where the Internet Protocol may be used), to an external network, a service packet that has been processed by the service processing system. The central switching device is used as a forwarding agent, and is configured to forward a service packet between devices inside the service processing system. The control device may be configured to perform control over all or a part of devices in the service processing system. The foregoing devices in the service processing system may be all disposed in a same machine, may be separately disposed in a different machine, or may be disposed in any combination, which is not limited in the present invention. A forwarding function and processing function of a same service atom may be deployed on different devices. Forwarding functions of multiple service atoms may be deployed on a same device (or entity unit). In addition, processing functions of these service atoms may also be deployed on different devices (or entity units).

Embodiment 1

Figure 1:
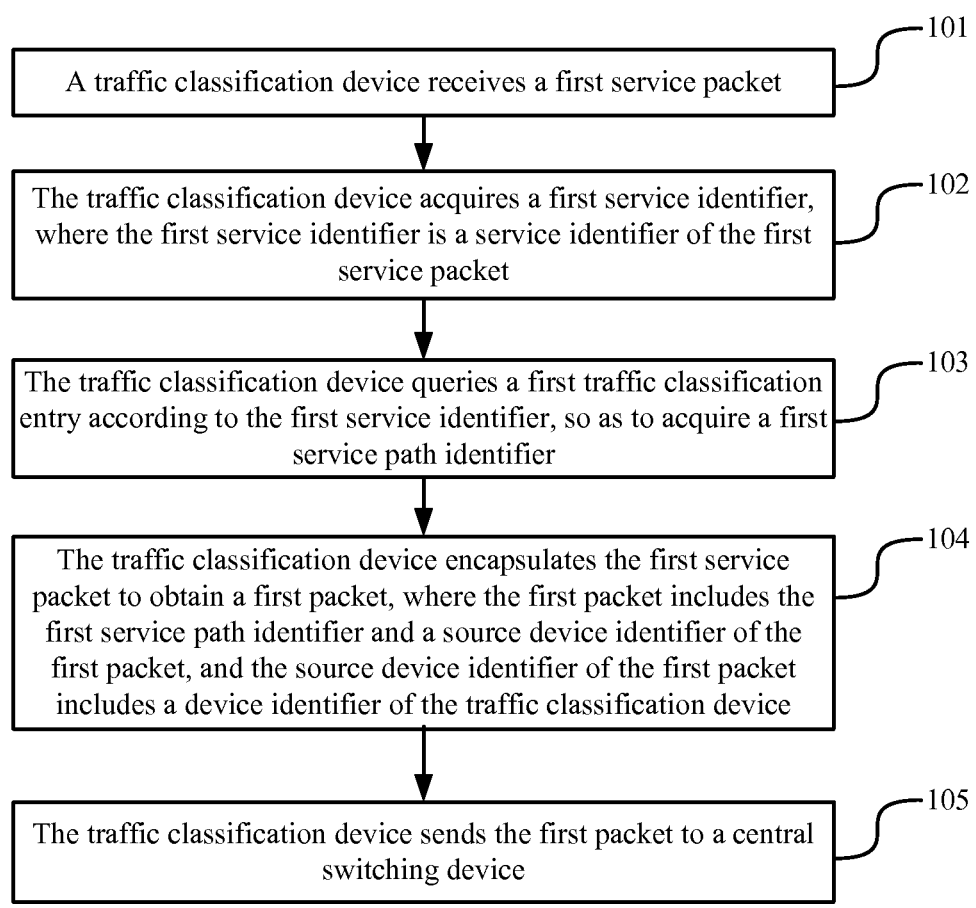
FIG. 1 is a flowchart of a service packet processing method according to an embodiment of the present invention.

This embodiment of the present invention provides a service packet processing method that is applied to a service processing system. The service processing system in this embodiment includes a central switching device. As shown in FIG. 1, a processing process of a traffic classification device in this method may include the following steps:

Step 101: A traffic classification device receives a first service packet.

The traffic classification device may be used as an ingress of the service processing system. The traffic classification device is configured to receive a service packet sent to the service processing system and forward the service packet to another device inside the service processing system.

Step 102: The traffic classification device acquires a first service identifier, where the first service identifier is a service identifier of the first service packet.

A service identifier may be a preset identifier that identifies a service. By using a service identifier, a service requesting to be processed can be mapped. A service identifier may be at least one element in a quintuple of a service packet, for example, a destination address. By using a destination address, a service requesting to be processed in a service packet can be mapped. A service identifier may also be a quintuple of a service packet. In addition, a service identifier may also be a destination MAC (Media Access Control) address in a service packet.

Step 103: The traffic classification device queries a first traffic classification entry according to the first service identifier, so as to acquire a first service path identifier. The first traffic classification entry includes a correspondence between the first service identifier and the first service path identifier.

Specifically, the traffic classification device may store a traffic classification table. The table records a correspondence between a service identifier and a service path identifier. In this way, by querying the table according to a service identifier in a service packet sent from outside of the service processing system, a corresponding service path identifier can be obtained by querying. In this step, the table is queried according to the first service identifier, so as to obtain, by querying, the first traffic classification entry including the first service identifier, and acquire, in the entry, the first service path identifier corresponding to the first service identifier.

Step 104: The traffic classification device encapsulates the first service packet to obtain a first packet, where the first packet includes the first service path identifier and a source device identifier of the first packet, and the source device identifier of the first packet includes a device identifier of the traffic classification device.

Specifically, the encapsulation is encapsulation performed inside the service processing system. Specifically, a header internally used in the service processing system may be added outside the first service packet, so as to obtain the first packet.

The header internally used in the service system may include a service path identifier. The service path identifier is an identifier of a current service path to which a packet obtained by encapsulating a service packet belongs in the service processing system. The header may also include a source device identifier of the packet. Moreover, the header may also include a destination device identifier of the packet. Preferably, information in a header may be arranged in a sequence of a source device identifier, a destination device identifier, and a service path identifier. The source device identifier is outermost in the header, and the service path identifier is innermost in the header.

For the first packet, a service path identifier may be the first service path identifier acquired in the foregoing step 103, a source device identifier may be the device identifier of the traffic classification device, and a destination device identifier may be a device identifier of a central switching device.

For a packet sent between two neighboring devices (which are directly connected with each other) inside the service processing system, a source device of the packet may be a device sending the packet in the two neighboring devices, and a destination device may be a device receiving the packet in the two neighboring devices. Correspondingly, a source device identifier is an identifier of the source device and a destination device identifier is an identifier of the destination device.

Step 105: The traffic classification device sends the first packet to a central switching device.

Specifically, the traffic classification device may record in advance a port connecting to the central switching device. When this step is executed, the first packet may be sent by using the port. In addition, the traffic classification device may record a correspondence between a device identifier, device IP (Internet Protocol) address, and port of each device connected to the traffic classification device. When this step is executed, the traffic classification device may search for a port corresponding to a device identifier of the central switching device and send the first packet by using a port obtained by searching.

Embodiment 2

This embodiment of the present invention provides a service packet processing method that is applied to a service processing system. The service processing system in this embodiment includes a central switching device. In the service processing system including the central switching device, the central switching device is used as a forwarding agent, and is configured to forward a service packet between devices (such as a traffic classification device, a service atom, and an egress device) inside the service processing system. Each service atom, traffic classification device, and egress device may be connected to the central switching device respectively.

Figure 2:
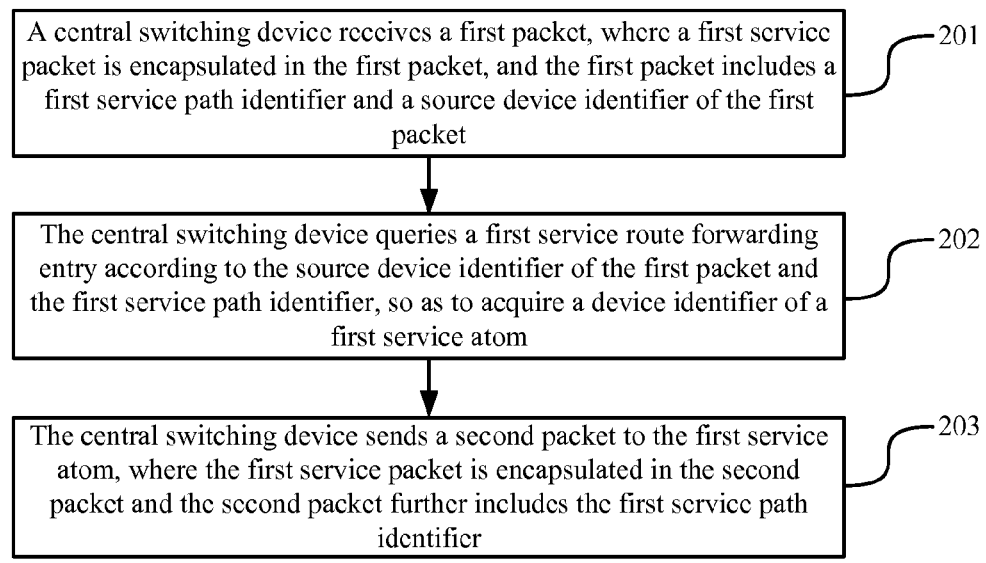
FIG. 2 is a flowchart of a service packet processing method according to an embodiment of the present invention.

As shown in FIG. 2, a processing process of the central switching device in this method may include the following steps.

Step 201: The central switching device receives a first packet, where a first service packet is encapsulated in the first packet, and the first packet includes a first service path identifier and a source device identifier of the first packet.

The first packet in Embodiment 2 may be the first packet in Embodiment 1 that is sent by the traffic classification device to the central switching device, or may be a packet that is sent by a service atom to the central switching device. The first service packet may be the first service packet in Embodiment 1, or may be a service packet encapsulated in a packet that is sent by a service atom to the central switching device. The first service path identifier may be the first service path identifier in Embodiment 1, or may be a service path identifier encapsulated in a packet that is sent by a service atom to the central switching device. When the first packet in Embodiment 2 is the first packet in Embodiment 1 that is sent by the traffic classification device to the central switching device, Embodiment 2 may be understood as continuation of Embodiment 1.

The first packet is obtained by performing internal encapsulation of the service processing system on the first service packet. In addition to including a service path identifier and the source device identifier of the first packet, an encapsulated header may also include a destination device identifier of the packet. For a specific encapsulation rule, reference may be made to the description in step 104 in Embodiment 1.

For the first packet, a service path identifier may be the first service path identifier, a source device identifier may be a device identifier of a traffic classification device or a service atom, and a destination device identifier may be a device identifier of the central switching device.

Step 202: The central switching device queries a first service route forwarding entry according to the source device identifier of the first packet and the first service path identifier, so as to acquire a device identifier of a first service atom, where the first service route forwarding entry includes a correspondence between the source device identifier of the first packet, the first service path identifier, and the device identifier of the first service atom.

The first packet may be a packet that is sent by a traffic classification device to the central switching device, or may be a packet that is sent by a service atom to the central switching device. Therefore, the source device identifier of the first packet may be a device identifier of the traffic classification device, or the source device identifier of the first packet may be a device identifier of the service atom.

Specifically, the central switching device may store a service route forwarding table. The table records a correspondence between a service path identifier of a received packet, a source device identifier of the received packet, and a destination device identifier of the received packet. In this way, by querying the table according to a service path identifier and a source device identifier that are encapsulated in a received packet, a corresponding destination device identifier of the packet can be obtained by querying. In this step, the table is queried according to the source device identifier of the first packet and the first service path identifier, so as to obtain, by querying, the first service route forwarding entry including the source device identifier of the first packet and the first service path identifier, and acquire, in the entry, the device identifier of the first service atom, where the device identifier of the first service atom corresponds to the source device identifier of the first packet and the first service path identifier.

In addition, when a destination device identifier, which is obtained by querying, of a received packet is a device identifier of an egress device, the central switching device may remove internal encapsulation of the service processing system from the first service packet and send the first service packet to the egress device.

The egress device is an egress of the service processing system, and is configured to send (where the Internet Protocol may be used), to an external network, a service packet that has been processed by the service processing system. The egress device may be a device at a tail end of a service path. The egress device may not perform specific service processing, but performs service packet forwarding only. A service packet forwarded to an external network of the service processing system does not include internal encapsulation of the service processing system. External forwarding performed by the egress device may be performed based on the IP. The egress device may be specifically a router or the like. Processing of removing internal encapsulation of the service processing system may also be executed by the egress device.

Step 203: The central switching device sends a second packet to the first service atom, where the first service packet is encapsulated in the second packet and the second packet further includes the first service path identifier.

Specifically, the central switching device may re-perform internal encapsulation of the service processing system on the first service packet. For a specific encapsulation rule, reference may be made to the description in step 104 in Embodiment 1.

The second packet may further include a source device identifier of the second packet, where the source device identifier of the second packet is the device identifier of the central switching device. The second packet may further include a destination device identifier of the second packet, where the destination device identifier of the second packet may be the device identifier, acquired in the foregoing step 202, of the first service atom.

The central switching device may record a correspondence between a device identifier, device IP address, and port of each device connected to the central switching device. When sending the second packet, the central switching device may search for a port corresponding to the device identifier of the first service atom and send the second packet by using a port obtained by searching.

After the central switching device sends the second packet to the first service atom, the first service atom may perform corresponding processing according to the second packet, to obtain a third packet and send the third packet to the central switching device (for a specific processing and sending process, reference may be made to the following Embodiment 3). The central switching device may further perform the following processing steps.

First, the central switching device receives the third packet sent by the first service atom, where the third packet includes a second service path identifier and a source device identifier of the third packet, and a second service packet is further encapsulated in the third packet, where the second service packet includes a part of a payload of the first service packet, all of a payload of the first service packet, or the first service packet.

The second service path identifier and the first service path identifier may be a same service path identifier, or may be different service path identifiers. For a specific encapsulation rule of the third packet, reference may be made to the description in step 104 in Embodiment 1. The source device identifier of the third packet is an identifier of the first service atom. In addition, the third packet may further include a destination device identifier of the third packet, where the destination device identifier of the third packet is the device identifier of the central switching device.

The second service packet is obtained by the first service atom according to service processing performed on the first service packet. In the service processing process, the payload of the first service packet may not be changed, that is, the second service packet includes all of the payload of the first service packet. In the service processing process, partial content of the payload of the first service packet may also be changed, that is, the second service packet includes a part of the payload of the first service packet. In the service processing process, the first service packet may not be changed, that is, the second service packet includes the first service packet.

Then, the central switching device queries a second service route forwarding entry according to the second service path identifier and the source device identifier of the third packet, so as to acquire a device identifier of a second service atom, where the second service route forwarding entry includes a correspondence between the source device identifier of the third packet, the second service path identifier, and the device identifier of the second service atom. A specific querying process is similar to step 202, and reference may be made to corresponding content in step 202.

Finally, the central switching device sends a fourth packet to the second service atom, where the second service packet is encapsulated in the fourth packet and the fourth packet further includes the second service path identifier. A specific querying process is similar to step 203, and reference may be made to corresponding content in step 203.

Embodiment 3

Figure 3:
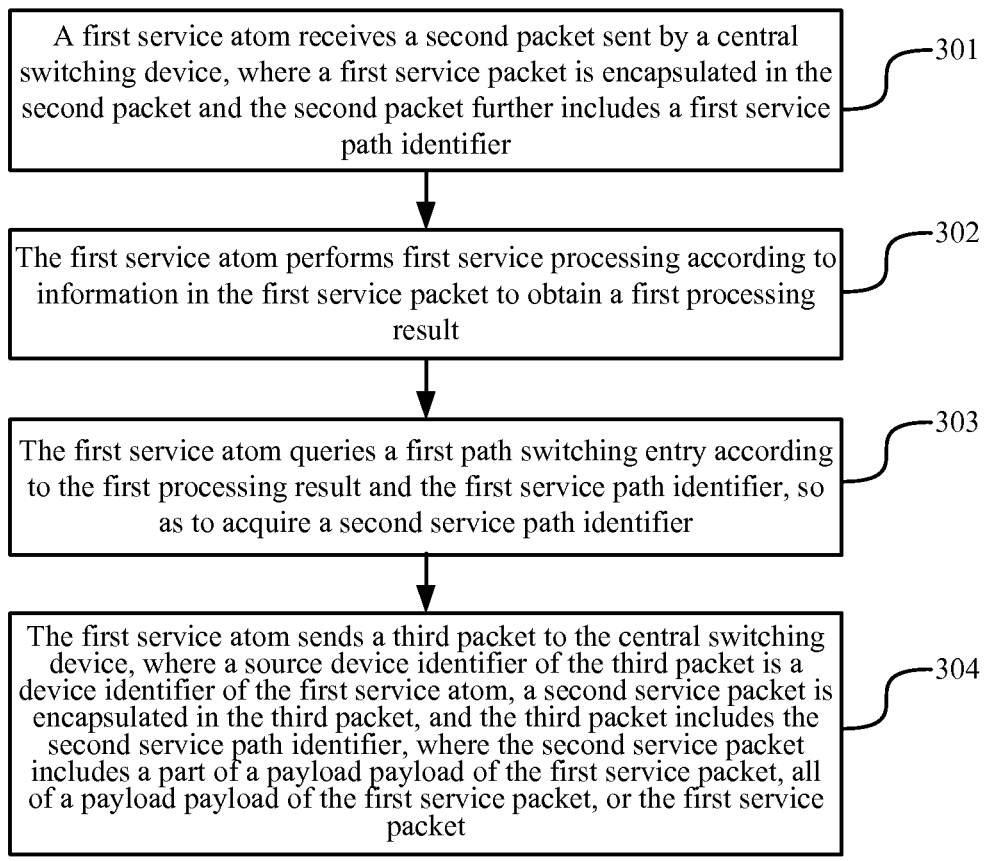
FIG. 3 is a flowchart of a service packet processing method according to an embodiment of the present invention.

This embodiment of the present invention provides a service packet processing method that is applied to a service processing system. The service processing system in this embodiment includes a central switching device. As shown in FIG. 3, a processing process of a service atom in this method may include the following steps.

Step 301: A first service atom receives a second packet sent by a central switching device, where a first service packet is encapsulated in the second packet and the second packet further includes a first service path identifier. The first service atom is any service atom in a service processing system.

The second packet is obtained by performing internal encapsulation of the service processing system on the first service packet. For a specific encapsulation rule, reference may be made to the description in step 104 in Embodiment 1. The second packet may further include a source device identifier of the second packet, where the source device identifier of the second packet is a device identifier of the central switching device. The second packet may further include a destination device identifier of the second packet, where the destination device identifier of the second packet may be the device identifier, acquired in the foregoing step 202, of the first service atom.

When the second packet in Embodiment 3 is the second packet in Embodiment 2 that is sent by the central switching device to the first service atom, Embodiment 3 may be understood as continuation of Embodiment 2.

Step 302: The first service atom performs first service processing according to information in the first service packet, to obtain a first processing result.

Specifically, the first service atom may acquire the information (such as a payload or a quintuple) in the first service packet, and then perform first service processing according to the acquired information. An obtained processing result may be a direct processing result. For example, if a function of a service atom A is determining whether access to a website whose access is requested in a service packet is allowed, a direct processing result is allowed or prohibited. An obtained processing result may also be a preset result code. For example, in the foregoing example, a corresponding result code may be set to 1 when a processing result is allowed and a corresponding result code may be set to 2 when a processing result is prohibited.

Step 303: The first service atom queries a first path switching entry according to the first processing result and the first service path identifier, so as to acquire a second service path identifier, where the first path switching entry includes a correspondence between the first processing result, the first service path identifier, and the second service path identifier. The second service path identifier and the first service path identifier may be a same service path identifier, or may be different service path identifiers.

Specifically, the first service atom may store a path switching table. The table records a correspondence between a service path identifier of an ingress path, a processing result, and a service path identifier of an egress path. In this way, by querying the table according to a service path identifier encapsulated in a received packet and a processing result, a corresponding service path identifier of an egress path can be obtained by querying. In this step, the table is queried according to the first processing result and the first service path identifier, so as to obtain, by querying, the first path switching entry including the first processing result and the first service path identifier, and acquire, in the entry, the second service path identifier corresponding to the first processing result and the first service path identifier.

In a path switching table of a service atom, if different processing results correspond to service path identifiers of different egress paths for a service path identifier of a same ingress path, the service atom may be known as a branch-type service atom, and a service that needs to be processed by the service atom may be known as a branch-type service.

Step 304: The first service atom sends a third packet to the central switching device, where a source device identifier of the third packet is a device identifier of the first service atom, a second service packet is encapsulated in the third packet, and the third packet includes the second service path identifier, where the second service packet includes a part of a payload of the first service packet, all of a payload of the first service packet, or the first service packet.

The second service packet is obtained by the first service atom according to the foregoing first service processing. In the service processing process, the payload of the first service packet may not be changed, that is, the second service packet includes all of the payload of the first service packet. In the service processing process, the first service packet may also not be changed. In addition, in the service processing process, partial content of the payload of the first service packet may also be changed, that is, the second service packet includes a part of the payload of the first service packet.

The third packet is obtained by performing internal encapsulation of the service processing system on the second service packet. For a specific encapsulation rule, reference may be made to the description in step 104 in Embodiment 1. For the third packet, a service path identifier is the second service path identifier, a source device identifier is the device identifier of the first service atom, and a destination device identifier is the device identifier of the central switching device.

A manner of sending the third packet is similar to a manner of sending a packet in the foregoing embodiments. Reference may be made to specific descriptions of the foregoing embodiments, and details are not described herein again.

In this embodiment of the present invention, preferably, a service atom may include a device (or an entity unit) responsible for a processing function and a device (or an entity unit) responsible for a forwarding function. In this way, in the foregoing process, first, the device (or entity unit) responsible for a forwarding function receives a service packet and sends the service packet to the device (or entity unit) responsible for a processing function to perform corresponding processing. Then, the device (or entity unit) responsible for a processing function returns a processing result to the device (or entity unit) responsible for a forwarding function. Finally, the device (or entity unit) responsible for a forwarding function performs processing performed in step 303 and step 304. In addition, before executing step 303 and step 304, the device responsible for a processing function may further send one service packet including a part or all of a payload of the service packet to the device (or entity unit) responsible for a forwarding function.

Embodiment 4

Figure 4:
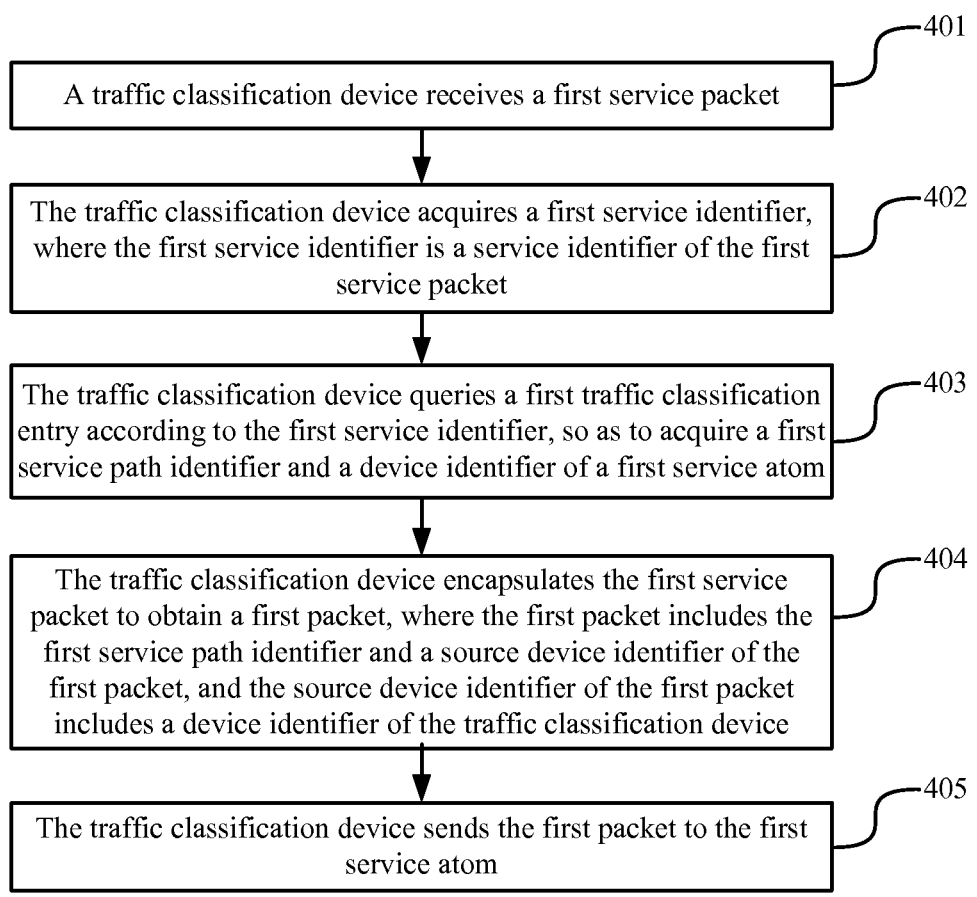
FIG. 4 is a flowchart of a service packet processing method according to an embodiment of the present invention.

This embodiment of the present invention provides a service packet processing method that is applied to a service processing system. The service processing system in this embodiment may not include a central switching device. As shown in FIG. 4, a processing process of a traffic classification device in this method may include the following steps.

Step 401: A traffic classification device receives a first service packet.

Step 402: The traffic classification device acquires a first service identifier, where the first service identifier is a service identifier of the first service packet.

For specific content of steps 401 and 402, reference may be made to steps 101 and 102 in Embodiment 1, and details are not described herein again.

Step 403: The traffic classification device queries a first traffic classification entry according to the first service identifier, so as to acquire a first service path identifier and a device identifier of a first service atom. The first traffic classification entry includes a correspondence between the first service identifier, the first service path identifier, and the device identifier of the first service atom. The correspondence between the first service identifier, the first service path identifier, and the device identifier of the first service atom includes a correspondence between the first service identifier and the first service path identifier, and also includes a correspondence between the first service identifier and the device identifier of the first service atom.

Specifically, the traffic classification device may store a traffic classification table. The table records a correspondence between a service identifier, a service path identifier, and a destination device identifier. In this way, by querying the table according to a service identifier in a service packet sent from outside a service processing system, a corresponding service path identifier and destination device identifier can be obtained by querying. In this step, the table is queried according to the first service identifier, so as to obtain, by querying, the first traffic classification entry including the first service identifier, and acquire, in the entry, the first service path identifier corresponding to the first service identifier and the device identifier, corresponding to the first service identifier, of the first service atom.

Step 404: The traffic classification device encapsulates the first service packet to obtain a first packet, where the first packet includes the first service path identifier and a source device identifier of the first packet, and the source device identifier of the first packet includes a device identifier of the traffic classification device.

The first packet is obtained by performing internal encapsulation of the service processing system on the first service packet. For a specific encapsulation rule, reference may be made to the description in step 104 in Embodiment 1. For the first packet, a service path identifier of the first packet may be the first service path identifier acquired in the foregoing step 403, and a source device identifier of the first packet may be the device identifier of the traffic classification device. The first packet may further include a destination device identifier. The destination device identifier of the first packet may be the device identifier, acquired in the foregoing step 403, of the first service atom.

Step 405: The traffic classification device sends the first packet to the first service atom.

A manner of sending the first packet is similar to a manner of sending a packet in the foregoing embodiments. Reference may be made to specific descriptions of the foregoing embodiments, and details are not described herein again.

Embodiment 5

Figure 5:
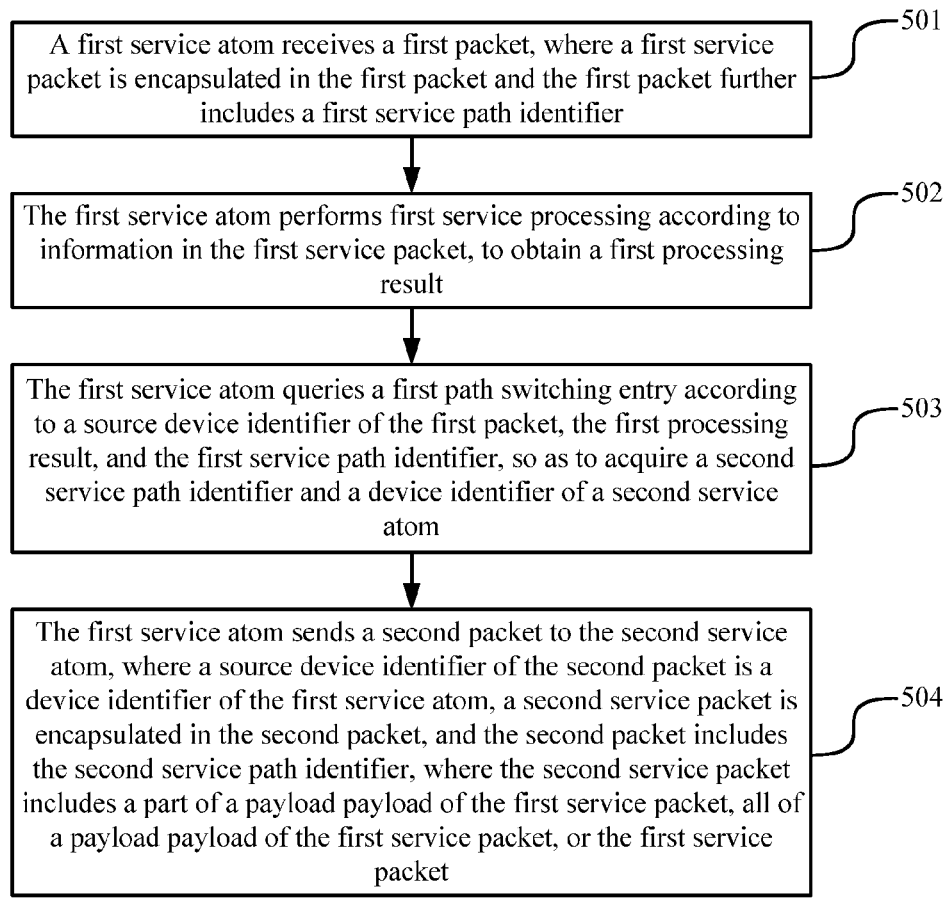
FIG. 5 is a flowchart of a service packet processing method according to an embodiment of the present invention.

This embodiment of the present invention provides a service packet processing method that is applied to a service processing system. The service processing system in this embodiment may not include a central switching device. As shown in FIG. 5, a processing process of a service atom in this method may include the following steps.

Step 501: A first service atom receives a first packet, where a first service packet is encapsulated in the first packet and the first packet further includes a first service path identifier. The first service atom is any service atom in a service processing system.

The first packet in Embodiment 5 may be the first packet in Embodiment 4 that is sent by the traffic classification device to the first service atom, or may be a packet that is sent by another service atom to the first service atom. When the first packet in Embodiment 5 is the first packet in Embodiment 4 that is sent by the traffic classification device to the first service atom, Embodiment 5 may be understood as continuation of Embodiment 4.

The first packet is obtained by performing internal encapsulation of the service processing system on the first service packet. For a specific encapsulation rule, reference may be made to the description in step 104 in Embodiment 1. A service path identifier of the first packet is the first service path identifier. The first packet may include a source device identifier. The source device identifier of the first packet may be a device identifier of the traffic classification device or a service atom. The first packet may further include a destination device identifier. A destination device identifier of the first packet may be a device identifier of the first service atom.

Step 502: The first service atom performs first service processing according to information in the first service packet, to obtain a first processing result. For specific content, reference may be made to step 302 in Embodiment 3, and details are not described herein again.

Step 503: The first service atom queries a first path switching entry according to a source device identifier of the first packet, the first processing result, and the first service path identifier, so as to acquire a second service path identifier and a device identifier of a second service atom. The first path switching entry includes a correspondence between the source device identifier of the first packet, the first processing result, the first service path identifier, the second service path identifier, and the device identifier of the second service atom. The correspondence between the source device identifier of the first packet, the first processing result, the first service path identifier, the second service path identifier, and the device identifier of the second service atom includes a correspondence between the source device identifier of the first packet, the first processing result, the first service path identifier, and the second service path identifier, and also includes a correspondence between the source device identifier of the first packet, the first processing result, the first service path identifier, and the device identifier of the second service atom.

Specifically, the first service atom may store a path switching table. The table records a correspondence between a source device identifier of an ingress path, a service path identifier of an ingress path, a processing result, a service path identifier of an egress path, and a destination device identifier of an egress path. In this way, by querying the table according to a service path identifier and a source device identifier that are encapsulated in a received packet and a processing result, a corresponding service path identifier and destination device identifier of an egress path can be obtained by querying. In this step, the table is queried according to the first processing result, the source device identifier of the first packet, and the first service path identifier, so as to obtain, by querying, the first path switching entry including the first processing result, the source device identifier of the first packet, and the first service path identifier, and acquire, in the entry, the corresponding second service path identifier and the corresponding device identifier of the second service atom.

Step 504: The first service atom sends a second packet to the second service atom, where a source device identifier of the second packet is the device identifier of the first service atom, a second service packet is encapsulated in the second packet, and the second packet includes the second service path identifier, where the second service packet includes a part of a payload of the first service packet, all of a payload of the first service packet, or the first service packet. For specific content, reference may be made to step 304 in Embodiment 3, and details are not described herein again.

The second packet is obtained by performing internal encapsulation of the service processing system on the second service packet. For a specific encapsulation rule, reference may be made to the description in step 104 in Embodiment 1. For the second packet, a service path identifier is the second service path identifier acquired in the foregoing step 503, a source device identifier is the device identifier of the first service atom, and a destination device identifier is the device identifier, acquired in the foregoing step 503, of the second service atom.

In the foregoing Embodiment 1 to Embodiment 5, the traffic classification table stored by the traffic classification device, the service route forwarding table stored by the central switching device, and the path switching table stored by each service atom may be all generated by a control device and respectively delivered to the devices, or certainly, may be respectively generated and stored by the devices. Optionally, path switching tables of service atoms may be a uniform shared path switching table, that is, the service atoms use a same path switching table, where the path switching table records an entry belonging to each service atom.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 6

Figure 6:
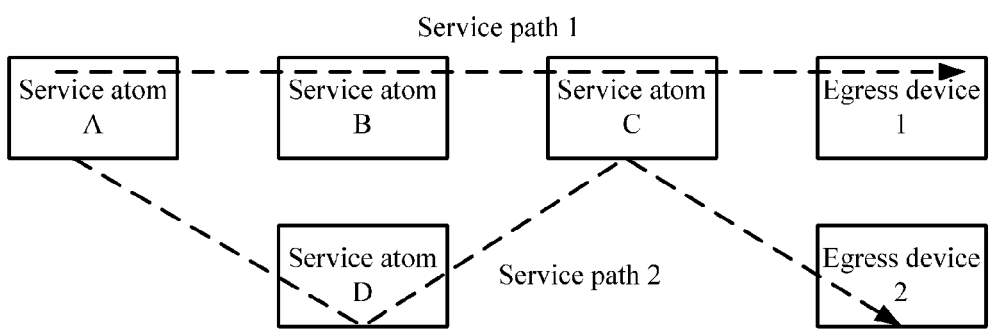
FIG. 6 is a schematic diagram of a service path according to an embodiment of the present invention.

The following describes a service packet processing method in this embodiment of the present invention in combination with one specific application scenario. In this embodiment, a service 1 is used as an example for description. As shown in FIG. 6, FIG. 6 is a schematic diagram of a service path for processing the service 1. The service 1 is jointly processed by a service atom A, a service atom B, a service atom C, and a service atom D (in this embodiment, identifiers of these service atoms are defined as A, B, C, and D, respectively). As shown in the figure, the service atom A is a branch-type service atom, and next-hop service atoms corresponding to two results of processing, by the service atom A, a service packet are the service atom B and the service atom D, respectively. In the figure, a processing sequence of a service path 1 is: service atom A, service atom B, service atom C, and egress device 1, and a processing sequence of a service path 2 is: service atom A, service atom D, service atom C, and egress device 2 (in this embodiment, identifiers of the service path 1 and the service path 2 are defined as SP1 and SP2, respectively, and device identifiers of the egress device 1 and the egress device 2 are EXIT1 and EXIT2, respectively).

Figure 7:
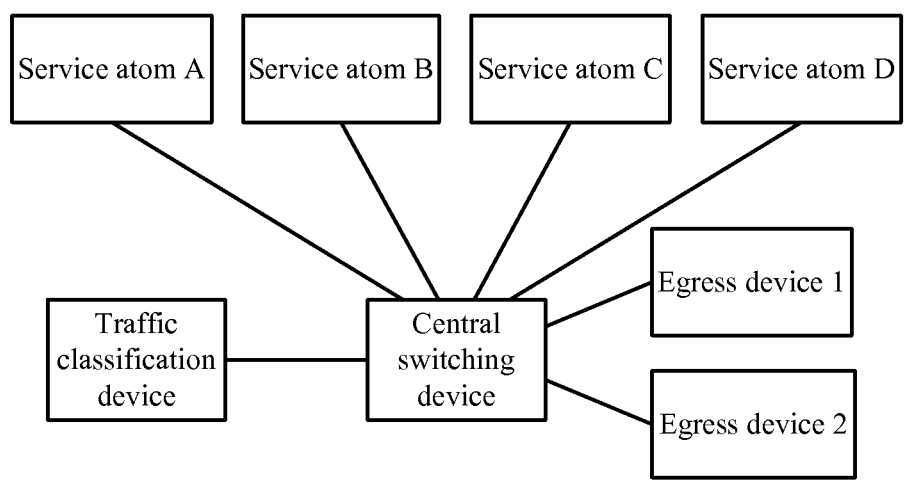
FIG. 7 is a schematic structural diagram of a service processing system according to an embodiment of the present invention.
Figure 8A:
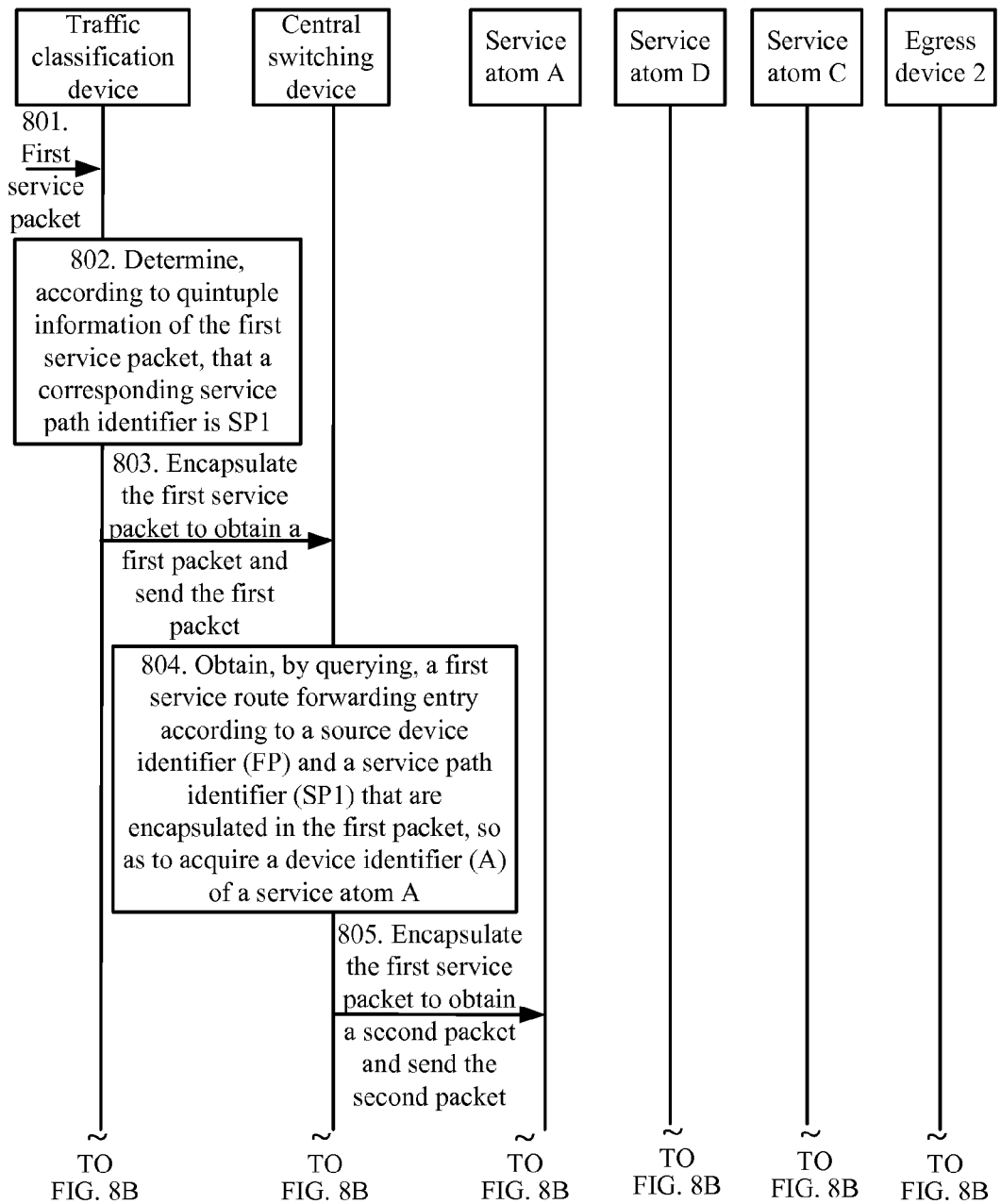
FIG. 8A to FIG. 8C are a flowchart of a service packet processing method according to an embodiment of the present invention.
Figure 8B:
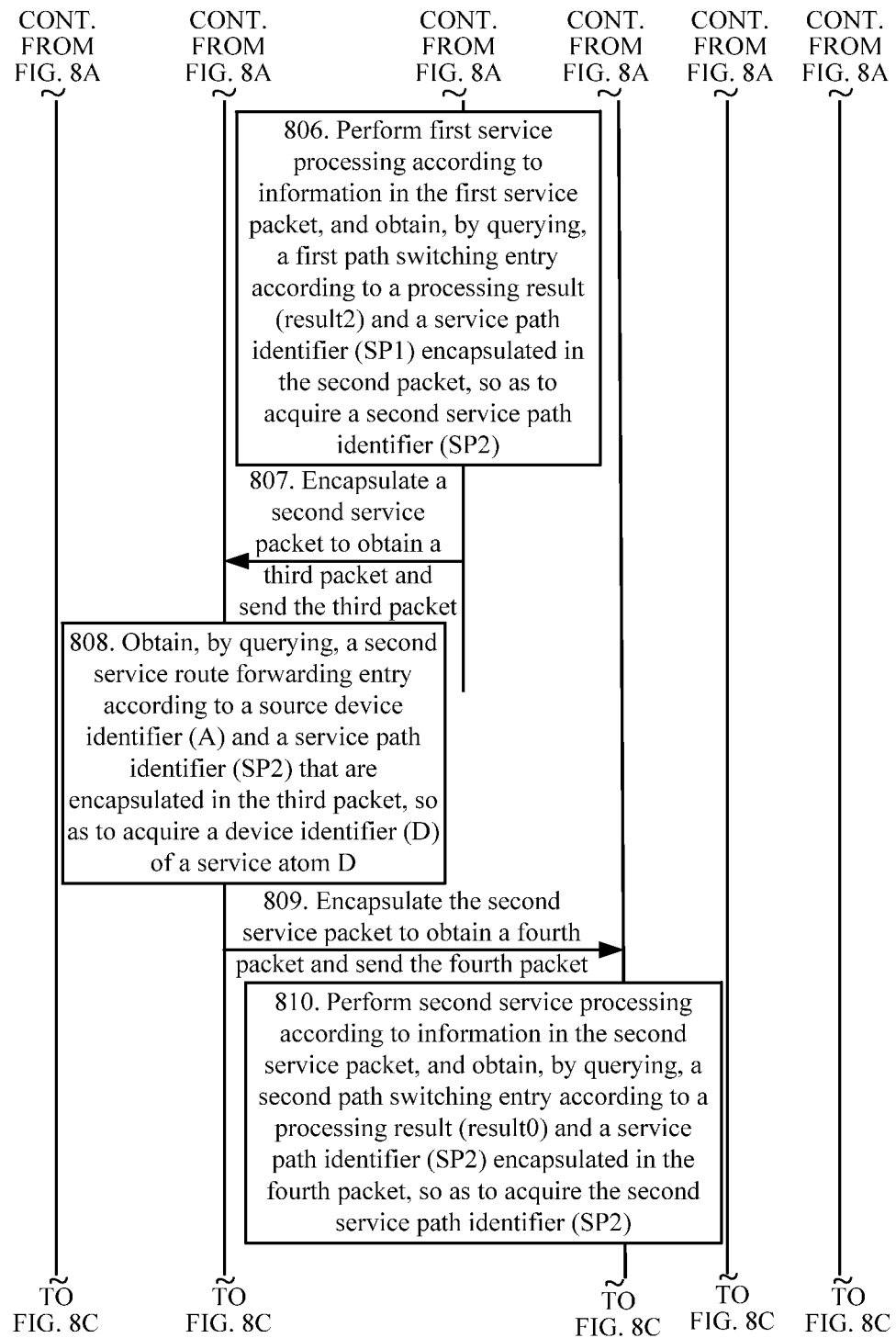
Figure 8C:
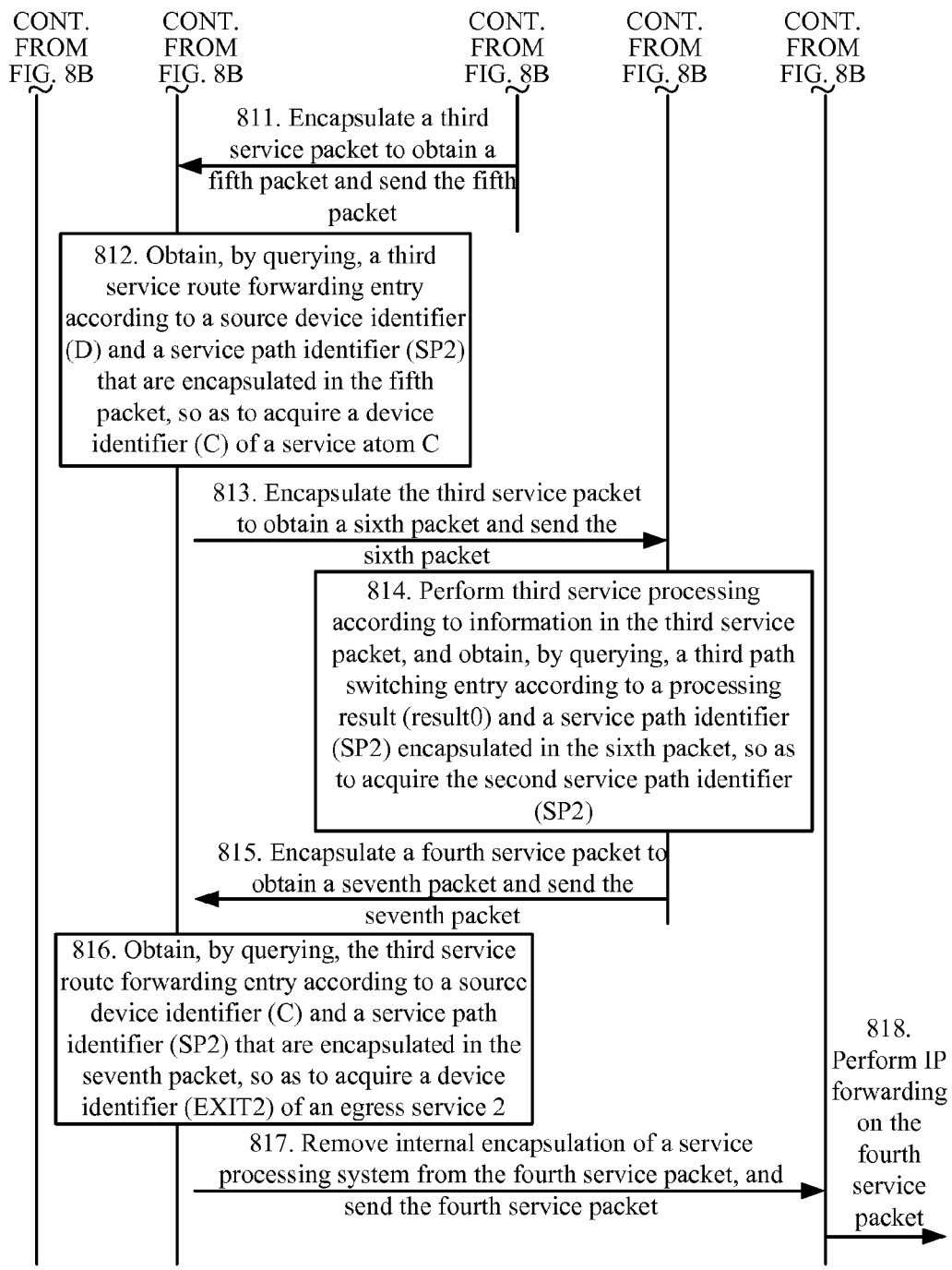

As shown in FIG. 7, FIG. 7 is a schematic structural diagram of a service processing system in this embodiment. In the schematic diagram, a service atom and an egress device that are unrelated to the service 1 are omitted. As shown in FIG. 8A to FIG. 8C, the service packet processing method in this embodiment of the present invention may include the following steps:

Step 801: A traffic classification device receives a first service packet. The first service packet is a packet that is sent by a device outside a service processing system to the service processing system.

Step 802: The traffic classification device determines, according to quintuple information of the first service packet, that a corresponding service path identifier is SP1 (it is assumed that a service corresponding to the service packet is the service 1 and the corresponding service path identifier is SP1). The traffic classification device may store a traffic classification table. The traffic classification table records a correspondence between quintuple information and a service path identifier.

Step 803: The traffic classification device encapsulates the first service packet to obtain a first packet and sends the first packet to a central switching device. The encapsulation is internal encapsulation of the service processing system. In an encapsulated header, a source device identifier is an identifier (which is defined as FP in this embodiment) of the traffic classification device, a destination device identifier is an identifier (which is defined as H in this embodiment) of the central switching device, and a service path identifier is SP1.

Step 804: The central switching device obtains, by querying, a first service route forwarding entry according to the source device identifier (FP) and the service path identifier (SP1) that are encapsulated in the first packet, so as to acquire the device identifier (A) of the service atom A. The central switching device may store a service route forwarding table. For details, reference may be made to Embodiment 2. For example, in an application scenario of this embodiment, a service route forwarding table of the central switching device may be shown in the following Table 1:

TABLE 1

| Service path identifier of a received packet | Source device identifier of a received packet t | Destination device identifier of a received packet |
| --- | --- | --- |
| SP1 | FP | A |
| SP1 | A | B |
| SP2 | A | D |
| SP1 | B | C |
| SP2 | D | C |
| SP1 | C | EXIT1 |
| SP2 | C | EXIT2 |

Step 805: The central switching device encapsulates the first service packet to obtain a second packet and sends the second packet to the service atom A. The encapsulation is internal encapsulation of the service processing system. A source device identifier of the second packet is H, a destination device identifier is A, and a service path identifier is still SP1.

Step 806: The service atom A performs first service processing (it is assumed that a result identifier of a processing result is result2) according to information in the first service packet, and obtains, by querying, a first path switching entry according to the processing result (result2) and the service path identifier (SP1) encapsulated in the second packet, so as to acquire a second service path identifier (SP2). The service atom A stores a path switching table. For details, reference may be made to Embodiment 3. When result identifiers of two processing results of the service atom A are result1 and result2, respectively, and when a service path identifier of an ingress path is SP1, a service path identifier, corresponding to result1, of an egress path is SP1, and a service path identifier, corresponding to result2, of an egress path is SP2. For example, in an application scenario of this embodiment, a path switching table of the service atom A may be shown in the following Table 2:

TABLE 2

| Service path identifier of an ingress path | Processing result | Service path identifier of an egress path |
| --- | --- | --- |
| SP1 | result1 | SP1 |
| SP1 | result2 | SP2 |

Step 807: The service atom A encapsulates a second service packet, which is obtained based on the first service packet, to obtain a third packet and sends the third packet to the central switching device. The second service packet includes a part of a payload of the first service packet, all of a payload of the first service packet, or the first service packet. A source device identifier of the third packet is A, a destination device identifier is H, and a service path identifier is SP2.

Step 808: The central switching device obtains, by querying, a second service route forwarding entry according to the source device identifier (A) and the service path identifier (SP2) that are encapsulated in the third packet, so as to acquire a device identifier (D) of a service atom D.

Step 809: The central switching device encapsulates the second service packet to obtain a fourth packet and sends the fourth packet to the service atom D. The encapsulation is internal encapsulation of the service processing system. A source device identifier of the fourth packet is H, a destination device identifier is D, and a service path identifier is still SP2.

Step 810: The service atom D performs second service processing (because the service atom D is a non-branch-type service atom, a result identifier of a processing result of the service atom D may be set to result0) according to information in the second service packet, and obtains, by querying, a second path switching entry according to the processing result (result0) and the service path identifier (SP2) encapsulated in the fourth packet, so as to acquire the second service path identifier (SP2).

Step 811: The service atom D encapsulates a third service packet, which is obtained based on the second service packet, to obtain a fifth packet and sends the fifth packet to the central switching device. The third service packet includes a part of a payload of the second service packet, all of a payload of the second service packet, or the second service packet. The encapsulation is internal encapsulation of the service processing system. A source device identifier of the fifth packet is D, a destination device identifier is H, and a service path identifier is still SP2.

Step 812: The central switching device obtains, by querying, a third service route forwarding entry according to the source device identifier (D) and the service path identifier (SP2) that are encapsulated in the fifth packet, so as to acquire a device identifier (C) of a service atom C.

Step 813: The central switching device encapsulates the third service packet to obtain a sixth packet and sends the sixth packet to the service atom C. The encapsulation is internal encapsulation of the service processing system. A source device identifier of the sixth packet is H, a destination device identifier is C, and a service path identifier is still SP2.

Step 814: The service atom C performs third service processing (the service atom C is also a non-branch-type service atom) according to information in the third service packet, and obtains, by querying, a third path switching entry according to a processing result (result0) and the service path identifier (SP2) encapsulated in the sixth packet, so as to acquire the second service path identifier (SP2).

Step 815: The service atom C encapsulates a fourth service packet, which is obtained based on the third service packet, to obtain a seventh packet and sends the seventh packet to the central switching device. The fourth service packet includes a part of a payload of the third service packet, all of a payload of the third service packet, or the third service packet. The encapsulation is internal encapsulation of the service processing system. A source device identifier of the seventh packet is C, a destination device identifier is H, and a service path identifier is still SP2.

Step 816: The central switching device obtains, by querying, the third service route forwarding entry according to the source device identifier (C) and the service path identifier (SP2) that are encapsulated in the seventh packet, so as to acquire a device identifier (EXIT2) of an egress device 2.

Step 817: The central switching device removes the internal encapsulation of the service processing system from the fourth service packet, and sends the fourth service packet to the egress device 2.

Step 818: The egress device 2 performs IP forwarding on the fourth service packet.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 7

The following describes a service packet processing method in this embodiment of the present invention in combination with another specific application scenario. In this embodiment, a service 1 is still used as an example for description. For a schematic diagram of a service path for processing the service 1, reference may be made to FIG. 6. Device identifiers and service path identifiers that are defined in this embodiment are the same as those in Embodiment 6.

Figure 9:
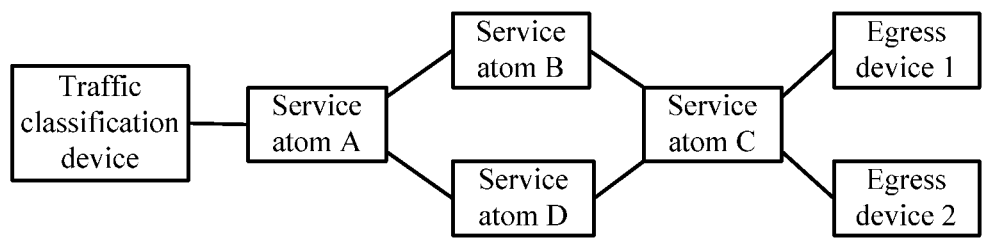
FIG. 9 is a schematic structural diagram of a service processing system according to an embodiment of the present invention.
Figure 10A:
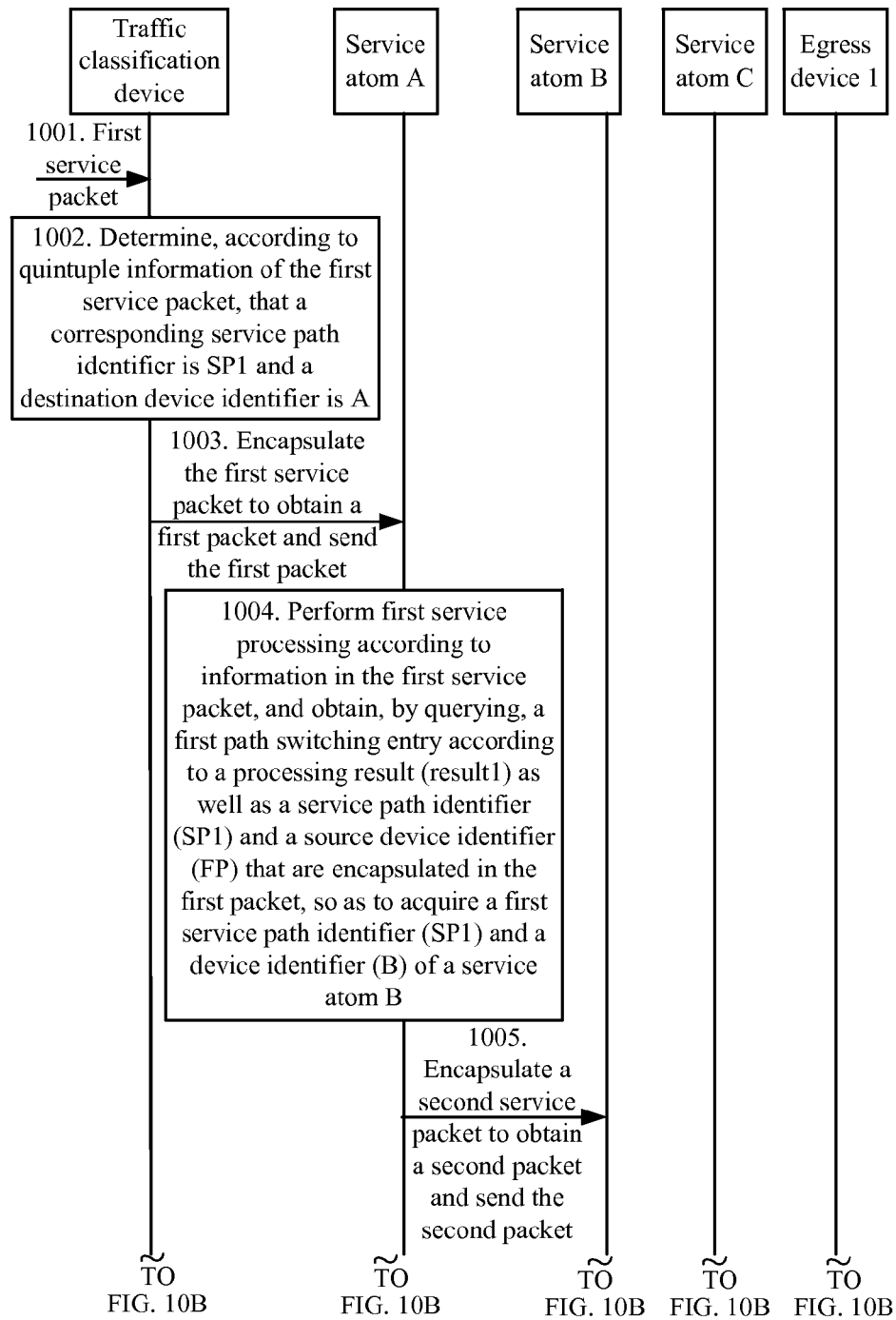
FIG. 10A and FIG. 10B are a flowchart of a service packet processing method according to an embodiment of the present invention.
Figure 10B:
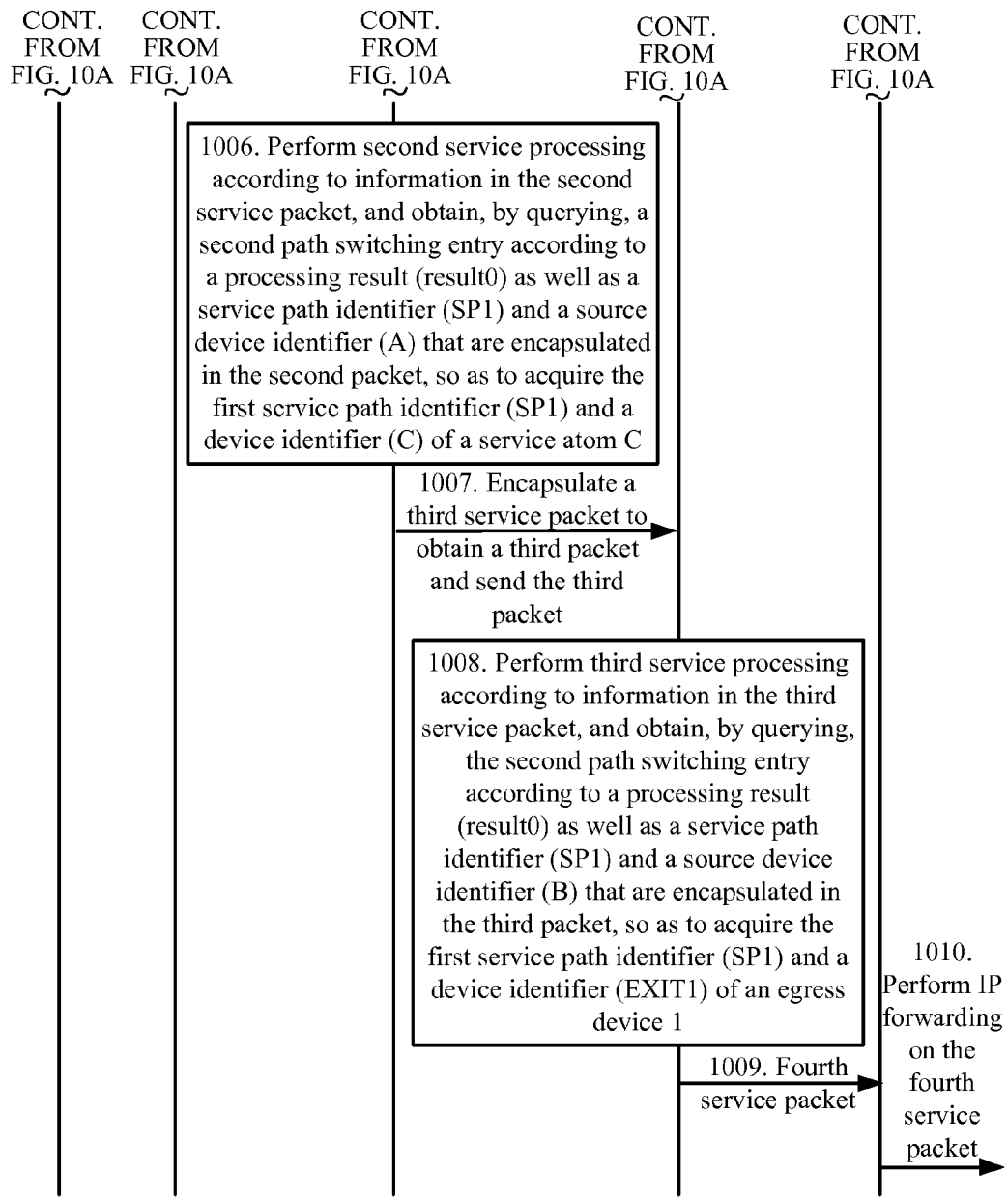

FIG. 9 is a schematic structural diagram of a service processing system in this embodiment (no central switching device is included in the service processing system). In the schematic diagram, a service atom and an egress device that are unrelated to the service 1 are omitted. Moreover, only a device connection related to the service 1 is drawn in the schematic diagram. Actually, in this embodiment, a connection may exist between any two devices in the service processing system. As shown in FIG. 10A and FIG. 10B, the service packet processing method in this embodiment of the present invention may include the following steps:

Step 1001: A traffic classification device receives a first service packet.

Step 1002: The traffic classification device determines, according to quintuple information of the first service packet, that a corresponding service path identifier is SP1 and a destination device identifier is A (it is assumed that a service corresponding to the service packet is the service 1 and the corresponding service path identifier is SP1, and a first service atom on the service path is a service atom A).

The traffic classification device may store a traffic classification table. The traffic classification table records a correspondence between the quintuple information, the service path identifier, and the destination device identifier.

Step 1003: The traffic classification device encapsulates the first service packet to obtain a first packet and sends the first packet to the service atom A. The encapsulation is internal encapsulation of a service processing system. A source device identifier is FP, a destination device identifier is A, and a service path identifier is still SP1.

Step 1004: The service atom A performs first service processing (it is assumed that a result identifier of a processing result is result1) according to information in the first service packet, and obtains, by querying, a first path switching entry (a first entry in Table 3) according to the processing result (result1) as well as the service path identifier (SP1, a service path identifier of an ingress path) and the source device identifier (FP) that are encapsulated in the first packet, so as to acquire a first service path identifier (SP1, a service path identifier of an egress path) and a device identifier (B) of a service atom B. The service atom A stores a path switching table. For details, reference may be made to Embodiment 5. When result identifiers of two processing results of the service atom A are result1 and result2, respectively, and when a service path identifier of an ingress path is SP1, and a source device identifier of the ingress path is FP, a service path identifier and a destination device identifier, corresponding to result1, of an egress path are SP1 and B, respectively, and a service path identifier and a destination device identifier, corresponding to the result 2, of an egress path are SP2 and D, respectively.

Step 1005: The service atom A encapsulates a second service packet, which is obtained based on the first service packet, to obtain a second packet and sends the second packet to the service atom B. The second service packet includes a part of a payload of the first service packet, all of a payload of the first service packet, or the first service packet. The encapsulation is internal encapsulation of the service processing system. A source device identifier is A, a destination device identifier is B, and a service path identifier is still SP1.

Step 1006: The service atom B performs second service processing (because the service atom B is a non-branch-type service atom, a result identifier of a processing result of the service atom B may be set to result0) according to information in the second service packet, and obtains, by querying, a second path switching entry according to the processing result (result0) as well as the service path identifier (SP1, a service path identifier of an ingress path) and the source device identifier (A) that are encapsulated in the second packet, so as to acquire the first service path identifier (SP1, a service path identifier of an egress path) and a device identifier (C) of a service atom C.

Step 1007: The service atom B encapsulates a third service packet, which is obtained based on the second service packet, to obtain a third packet and sends the third packet to the service atom C. The third service packet includes a part of a payload of the second service packet, all of a payload of the second service packet, or the second service packet. The encapsulation is internal encapsulation of the service processing system. A source device identifier is B, a destination device identifier is C, and a service path identifier is still SP1.

Step 1008: The service atom C performs third service processing (the service atom C is also a non-branch-type service atom) according to information in the third service packet, and obtains, by querying, the second path switching entry according to a processing result (result0) as well as the service path identifier (SP1) and the source device identifier (B) that are encapsulated in the third packet, so as to acquire the first service path identifier (SP1) and a device identifier (EXIT1) of an egress device 1.

Preferably, a path switching table of each service atom may be a uniform shared path switching table, that is, the each service atom uses a same path switching table, where the path switching table records an entry belonging to the each service atom. For example, in an application scenario of this embodiment, a path switching table of a service atom may be shown in the following Table 3:

TABLE 3

| Service path identifier of an ingress path | Source device identifier of an ingress path | Processing result | Service path identifier of an egress path | Destination device identifier of an egress path |
|---|---|---|---|---|
| SP1 | FP | result1 | SP1 | B |
| SP1 | FP | result2 | SP2 | D |
| SP1 | A | result0 | SP1 | C |
| SP2 | A | result0 | SP2 | C |
| SP1 | B | result0 | SP1 | EXIT1 |
| SP2 | D | result0 | SP2 | EXIT2 |

Step 1009: The service atom C sends a fourth service packet, which is obtained based on the third service packet, to the egress device 1. The fourth service packet includes a part of a payload of the third service packet, all of a payload of the third service packet, or the third service packet. Internal encapsulation of the service processing system is not performed on the fourth service packet.

Step 1010: The egress device 1 performs IP forwarding on the fourth service packet.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 8

Figure 11:
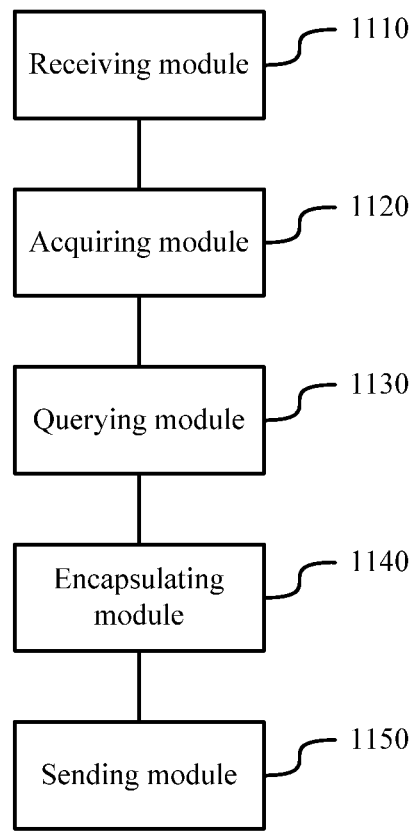
FIG. 11 is a schematic structural diagram of a traffic classification device according to an embodiment of the present invention.

This embodiment of the present invention provides a traffic classification device that is applied to a service processing system. As shown in FIG. 11, the traffic classification device includes: a receiving module 1110, configured to receive a first service packet; an acquiring module 1120, configured to acquire a first service identifier, where the first service identifier is a service identifier of the first service packet; a querying module 1130, configured to query a first traffic classification entry according to the first service identifier, so as to acquire a first service path identifier, where the first traffic classification entry includes a correspondence between the first service identifier and the first service path identifier; an encapsulating module 1140, configured to encapsulate the first service packet to obtain a first packet, where the first packet includes the first service path identifier and a source device identifier of the first packet, and the source device identifier of the first packet includes a device identifier of the traffic classification device; and a sending module 1150, configured to send the first packet to a central switching device.

In addition, the traffic classification device in this embodiment can execute all operations executed by the traffic classification device in Embodiment 1.

Figure 12:
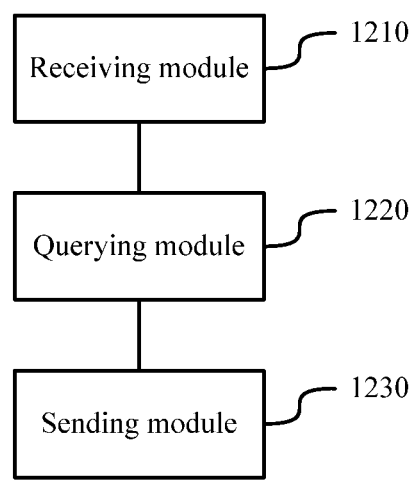
FIG. 12 is a schematic structural diagram of a central switching device according to an embodiment of the present invention.

This embodiment of the present invention further provides a central switching device that is applied to a service processing system. As shown in FIG. 12, the central switching device includes: a receiving module 1210, configured to receive a first packet, where a first service packet is encapsulated in the first packet, and the first packet includes a first service path identifier and a source device identifier of the first packet; a querying module 1220, configured to query a first service route forwarding entry according to the source device identifier of the first packet and the first service path identifier, so as to acquire a device identifier of a first service atom, where the first service route forwarding entry includes a correspondence between the source device identifier of the first packet, the first service path identifier, and the device identifier of the first service atom; and a sending module 1230, configured to send a second packet to the first service atom, where the first service packet is encapsulated in the second packet and the second packet further includes the first service path identifier.

Preferably, the source device identifier of the first packet includes a device identifier of a traffic classification device, or the source device identifier of the first packet includes a device identifier of a service atom.

Preferably, the receiving module 1210 is further configured to receive a third packet sent by the first service atom, where the third packet includes a second service path identifier and a second service packet is further encapsulated in the third packet, where the second service packet includes a part of a payload (payload) of the first service packet, all of a payload (payload) of the first service packet, or the first service packet; the querying module 1220 is further configured to query a second service route forwarding entry according to the second service path identifier and a source device identifier of the third packet, so as to acquire a device identifier of a second service atom, where the second service route forwarding entry includes a correspondence between the source device identifier of the third packet, the second service path identifier, and the device identifier of the second service atom; and the sending module 1230 is further configured to send a fourth packet to the second service atom, where the second service packet is encapsulated in the fourth packet and the fourth packet further includes the second service path identifier.

In addition, the central switching device in this embodiment can execute all operations executed by the central switching device in Embodiment 2.

Figure 13:
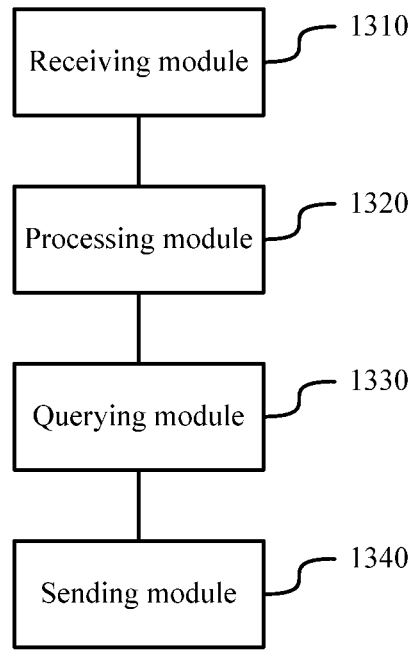
FIG. 13 is a schematic structural diagram of a service atom according to an embodiment of the present invention.

This embodiment of the present invention further provides a first service atom that is applied to a service processing system. As shown in FIG. 13, the first service atom includes: a receiving module 1310, configured to receive a second packet sent by a central switching device, where a first service packet is encapsulated in the second packet and the second packet further includes a first service path identifier; a processing module 1320, configured to perform first service processing according to information in the first service packet, to obtain a first processing result; a querying module 1330, configured to query a first path switching entry according to the first processing result and the first service path identifier, so as to acquire a second service path identifier, where the first path switching entry includes a correspondence between the first processing result, the first service path identifier, and the second service path identifier; and a sending module 1340, configured to send a third packet to the central switching device, where a source device identifier of the third packet is a device identifier of the first service atom, a second service packet is encapsulated in the third packet, the second service packet includes all or a part of a payload of the first service packet, and the third packet further includes the second service path identifier.

In addition, the first service atom in this embodiment can execute all operations executed by the first service atom in Embodiment 3.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 9

Figure 14:
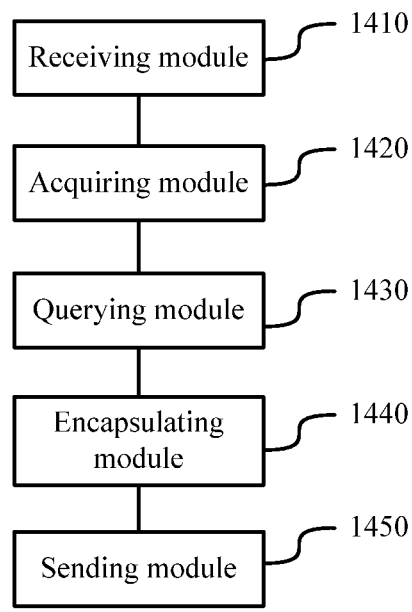
FIG. 14 is a schematic structural diagram of a traffic classification device according to an embodiment of the present invention.

This embodiment of the present invention further provides a traffic classification device that is applied to a service processing system. As shown in FIG. 14, the traffic classification device includes: a receiving module 1410, configured to receive a first service packet; an acquiring module 1420, configured to acquire a first service identifier, where the first service identifier is a service identifier of the first service packet; a querying module 1430, configured to query a first traffic classification entry according to the first service identifier, so as to acquire a first service path identifier and a device identifier of a first service atom, where the first traffic classification entry includes a correspondence between the first service identifier, the first service path identifier, and the device identifier of the first service atom; an encapsulating module 1440, configured to encapsulate the first service packet to obtain a first packet, where the first packet includes the first service path identifier and a source device identifier of the first packet, and the source device identifier of the first packet includes a device identifier of the traffic classification device; and a sending module 1450, configured to send the first packet to the first service atom.

In addition, the traffic classification device in this embodiment can execute all operations executed by the traffic classification device in Embodiment 4.

Figure 15:
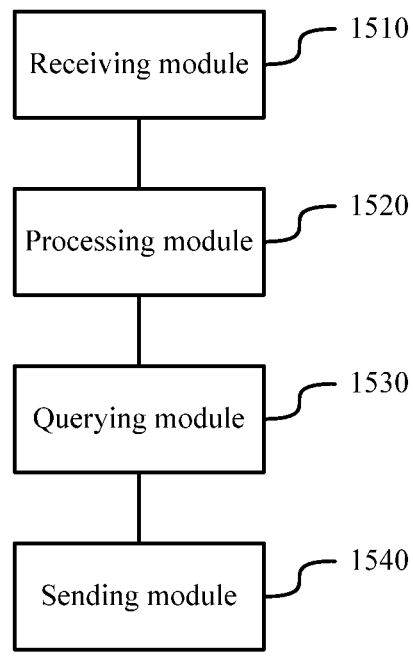
FIG. 15 is a schematic structural diagram of a service atom according to an embodiment of the present invention.

This embodiment of the present invention further provides a first service atom that is applied to a service processing system. As shown in FIG. 15, the first service atom includes: a receiving module 1510, configured to receive a first packet, where a first service packet is encapsulated in the first packet and the first packet further includes a first service path identifier; a processing module 1520, configured to perform first service processing according to information in the first service packet, to obtain a first processing result; a querying module 1530, configured to query a first path switching entry according to a source device identifier of the first packet, the first processing result, and the first service path identifier, so as to acquire a second service path identifier and a device identifier of a second service atom, where the first path switching entry includes a correspondence between the source device identifier of the first packet, the first processing result, the first service path identifier, the second service path identifier, and the device identifier of the second service atom; and a sending module 1540, configured to send a second packet to the second service atom, where a source device identifier of the second packet is a device identifier of the first service atom, a second service packet is encapsulated in the second packet, the second service packet includes all or a part of a payload of the first service packet, and the second packet further includes the second service path identifier.

In addition, the first service atom in this embodiment can execute all operations executed by the first service atom in Embodiment 5.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 10

Figure 16:
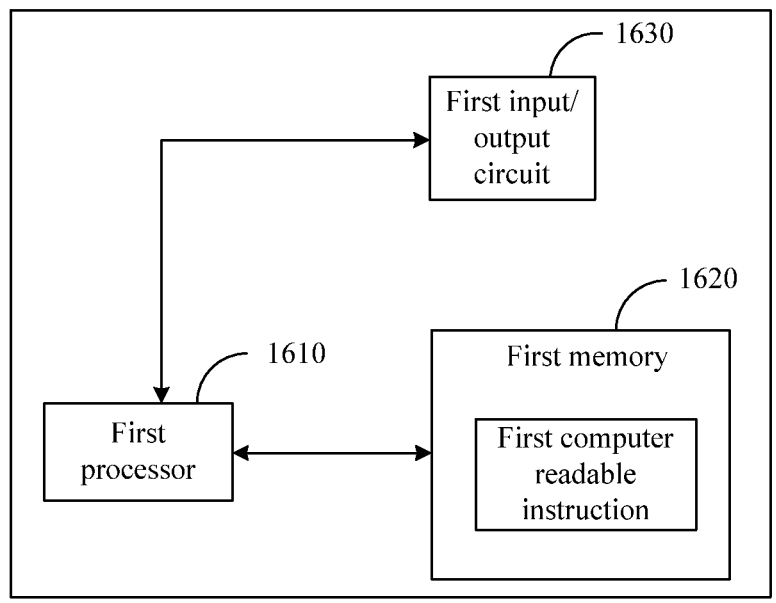
FIG. 16 is a schematic structural diagram of a traffic classification device according to an embodiment of the present invention.

This embodiment of the present invention further provides a traffic classification device that is applied to a service processing system. As shown in FIG. 16, the traffic classification device includes a first processor 1610, a first memory 1620, and a first input/output circuit 1630. The first memory 1620 stores a first computer readable instruction. The first processor 1610 reads the first computer readable instruction, and cooperates with the first input/output circuit 1630 to execute the following processing process: receiving a first service packet; acquiring a first service identifier, where the first service identifier is a service identifier of the first service packet; querying a first traffic classification entry according to the first service identifier, so as to acquire a first service path identifier, where the first traffic classification entry includes a correspondence between the first service identifier and the first service path identifier; encapsulating the first service packet to obtain a first packet, where the first packet includes the first service path identifier and a source device identifier of the first packet, and the source device identifier of the first packet includes a device identifier of the traffic classification device; and sending, by the traffic classification device, the first packet to a central switching device.

In addition, the first processor reads the first computer readable instruction, and cooperates with the first input/output circuit to further execute all operations executed by the traffic classification device in Embodiment 1.

Figure 17:
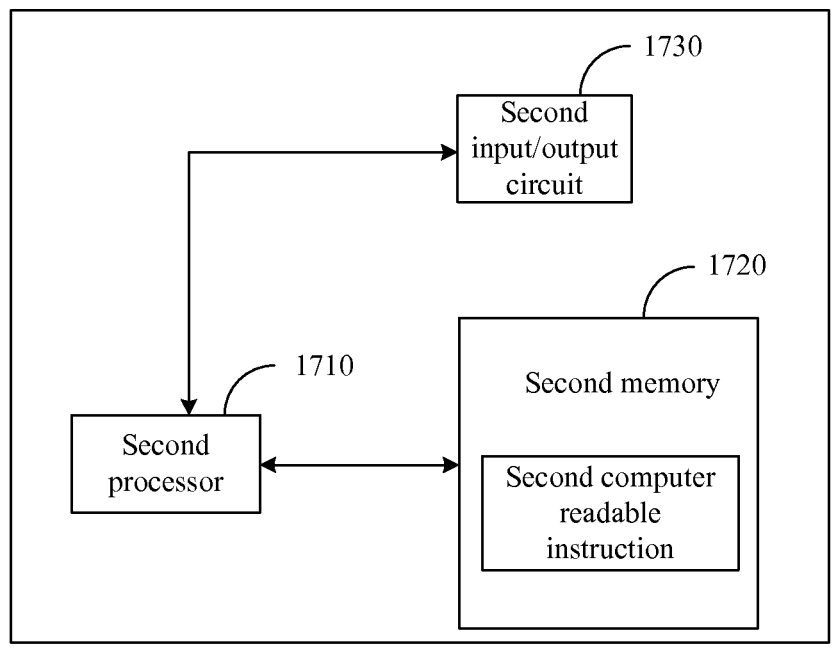
FIG. 17 is a schematic structural diagram of a central switching device according to an embodiment of the present invention.

This embodiment of the present invention further provides a central switching device that is applied to a service processing system. As shown in FIG. 17, the central switching device includes a second processor 1710, a second memory 1720, and a second input/output circuit 1730. The second memory 1720 stores a second computer readable instruction. The second processor 1710 reads the second computer readable instruction, and cooperates with the second input/output circuit 1730 to execute the following processing process: receiving a first packet, where a first service packet is encapsulated in the first packet, and the first packet includes a first service path identifier and a source device identifier of the first packet; querying a first service route forwarding entry according to the source device identifier of the first packet and the first service path identifier, so as to acquire a device identifier of a first service atom, where the first service route forwarding entry includes a correspondence between the source device identifier of the first packet, the first service path identifier, and the device identifier of the first service atom; and sending, by the central switching device, a second packet to the first service atom, where the first service packet is encapsulated in the second packet and the second packet further includes the first service path identifier.

Preferably, the source device identifier of the first packet includes a device identifier of a traffic classification device, or the source device identifier of the first packet includes a device identifier of a service atom.

Preferably, the processing process further includes: receiving a third packet sent by the first service atom, where the third packet includes a second service path identifier and a second service packet is further encapsulated in the third packet, where the second service packet includes a part of a payload of the first service packet, all of a payload of the first service packet, or the first service packet; querying, by the central switching device, a second service route forwarding entry according to the second service path identifier and a source device identifier of the third packet, so as to acquire a device identifier of a second service atom, where the second service route forwarding entry includes a correspondence between the source device identifier of the third packet, the second service path identifier, and the device identifier of the second service atom; and sending, by the central switching device, a fourth packet to the second service atom, where the second service packet is encapsulated in the fourth packet and the fourth packet further includes the second service path identifier.

In addition, the second processor reads the second computer readable instruction, and cooperates with the second input/output circuit to further execute all operations executed by the central switching device in Embodiment 2.

Figure 18:
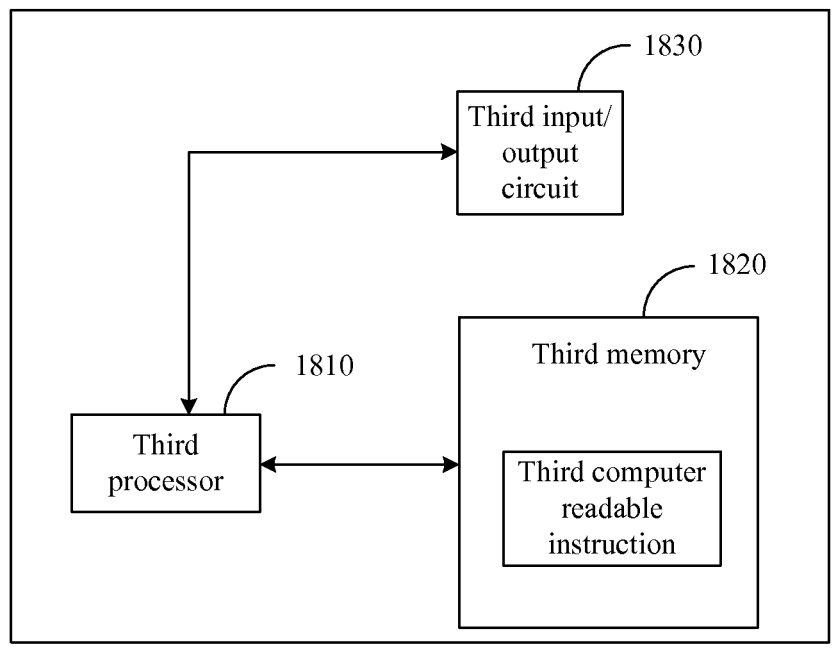
FIG. 18 is a schematic structural diagram of a service atom according to an embodiment of the present invention.

This embodiment of the present invention further provides a first service atom that is applied to a service processing system. As shown in FIG. 18, the first service atom includes a third processor 1810, a third memory 1820, and a third input/output circuit 1830. The third memory 1820 stores a third computer readable instruction. The third processor 1810 reads the third computer readable instruction, and cooperates with the third input/output circuit 1830 to execute the following processing process: receiving a second packet sent by a central switching device, where a first service packet is encapsulated in the second packet and the second packet further includes a first service path identifier; performing first service processing according to information in the first service packet, to obtain a first processing result; querying a first path switching entry according to the first processing result and the first service path identifier, so as to acquire a second service path identifier, where the first path switching entry includes a correspondence between the first processing result, the first service path identifier, and the second service path identifier; and sending, by the first service atom, a third packet to the central switching device, where a source device identifier of the third packet is a device identifier of the first service atom, a second service packet is encapsulated in the third packet, the second service packet includes all or a part of a payload of the first service packet, and the third packet further includes the second service path identifier.

In addition, the third processor reads the third computer readable instruction, and cooperates with the third input/output circuit to further execute all operations executed by the service atom in Embodiment 3.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 11

Figure 19:
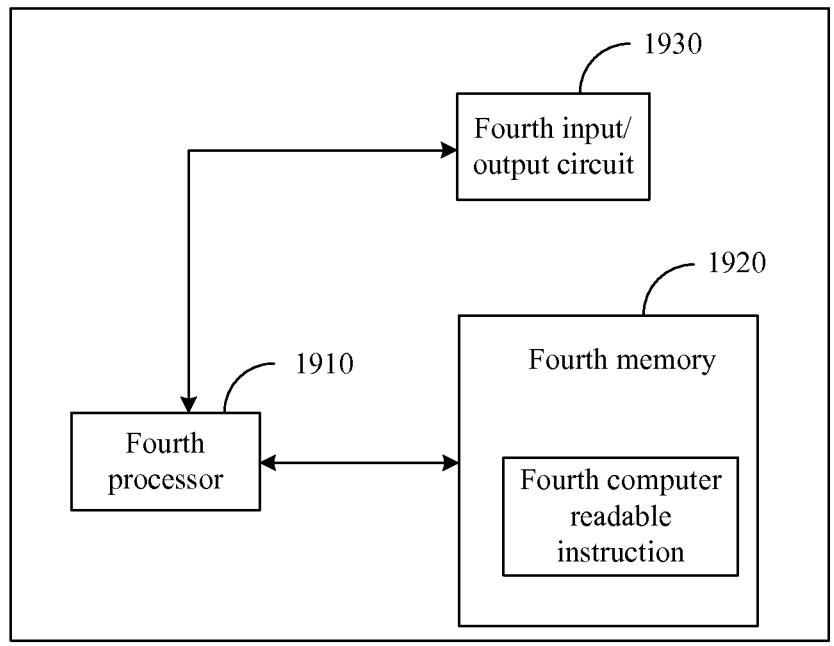
FIG. 19 is a schematic structural diagram of a traffic classification device according to an embodiment of the present invention.

This embodiment of the present invention further provides a traffic classification device that is applied to a service processing system. As shown in FIG. 19, the traffic classification device includes a fourth processor 1910, a fourth memory 1920, and a fourth input/output circuit 1930. The fourth memory 1920 stores a fourth computer readable instruction. The fourth processor 1910 reads the fourth computer readable instruction, and cooperates with the fourth input/output circuit 1930 to execute the following processing process: receiving a first service packet; acquiring a first service identifier, where the first service identifier is a service identifier of the first service packet; querying, by the traffic classification device, a first traffic classification entry according to the first service identifier, so as to acquire a first service path identifier and a device identifier of a first service atom, where the first traffic classification entry includes a correspondence between the first service identifier, the first service path identifier, and the device identifier of the first service atom; encapsulating, by the traffic classification device, the first service packet to obtain a first packet, where the first packet includes the first service path identifier and a source device identifier of the first packet, and the source device identifier of the first packet includes a device identifier of the traffic classification device; and sending, by the traffic classification device, the first packet to the first service atom.

In addition, the fourth processor reads the fourth computer readable instruction, and cooperates with the fourth input/output circuit to further execute all operations executed by the traffic classification device in Embodiment 4.

Figure 20:
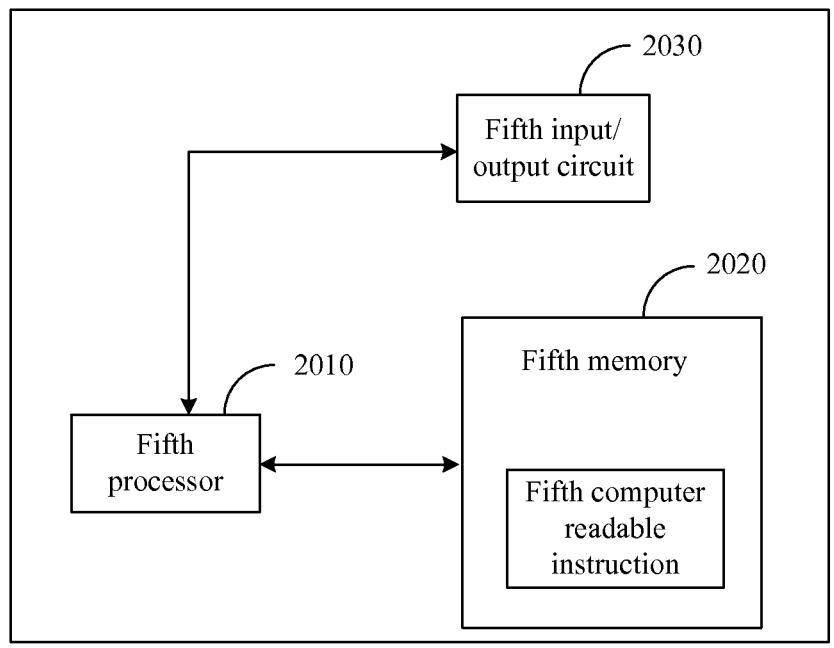
FIG. 20 is a schematic structural diagram of a service atom according to an embodiment of the present invention.

This embodiment of the present invention further provides a first service atom that is applied to a service processing system. As shown in FIG. 20, the first service atom includes a fifth processor 2010, a fifth memory 2020, and a fifth input/output circuit 2030. The fifth memory 2020 stores a fifth computer readable instruction. The fifth processor 2010 reads the fifth computer readable instruction, and cooperates with the fifth input/output circuit 2030 to execute the following processing process: receiving a first packet, where a first service packet is encapsulated in the first packet and the first packet further includes a first service path identifier; performing, by the first service atom, first service processing according to information in the first service packet, to obtain a first processing result; querying, by the first service atom, a first path switching entry according to a source device identifier of the first packet, the first processing result, and the first service path identifier, so as to acquire a second service path identifier and a device identifier of a second service atom, where the first path switching entry includes a correspondence between the source device identifier of the first packet, the first processing result, the first service path identifier, the second service path identifier, and the device identifier of the second service atom; and sending, by the first service atom, a second packet to the second service atom, where a source device identifier of the second packet is a device identifier of the first service atom, a second service packet is encapsulated in the second packet, and the second packet includes the second service path identifier, where the second service packet includes a part of a payload of the first service packet, all of a payload of the first service packet, or the first service packet.

In addition, the fifth processor reads the fifth computer readable instruction, and cooperates with the fifth input/output circuit to further execute all operations executed by the service atom in Embodiment 5.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 12

Figure 21:
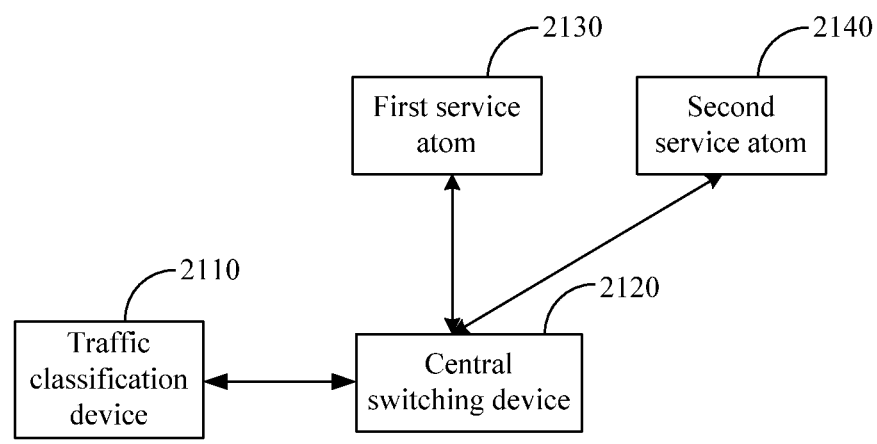
FIG. 21 is a schematic structural diagram of a service processing system according to an embodiment of the present invention.

This embodiment of the present invention further provides a service processing system. As shown in FIG. 21, the service processing system includes a traffic classification device 2110, a central switching device 2120, a first service atom 2130, and a second service atom 2140, where: the traffic classification device 2110 is configured to receive a first service packet; acquire a first service identifier, where the first service identifier is a service identifier of the first service packet; query a first traffic classification entry according to the first service identifier, so as to acquire a first service path identifier, where the first traffic classification entry includes a correspondence between the first service identifier and the first service path identifier; encapsulate the first service packet to obtain a first packet, where the first packet includes the first service path identifier and a source device identifier of the first packet, and the source device identifier of the first packet includes a device identifier of the traffic classification device; and send the first packet to the central switching device; the central switching device 2120 is configured to receive the first packet sent by the traffic classification device, where the first service packet is encapsulated in the first packet, and the first packet includes the first service path identifier and the source device identifier of the first packet; query a first service route forwarding entry according to the source device identifier of the first packet and the first service path identifier, so as to acquire a device identifier of a first service atom, where the first service route forwarding entry includes a correspondence between the source device identifier of the first packet, the first service path identifier, and the device identifier of the first service atom; and send a second packet to the first service atom, where the first service packet is encapsulated in the second packet and the second packet further includes the first service path identifier; and the first service atom 2130 is configured to receive the second packet sent by the central switching device, where the first service packet is encapsulated in the second packet and the second packet further includes the first service path identifier; perform first service processing according to information in the first service packet, to obtain a first processing result; query a first path switching entry according to the first processing result and the first service path identifier, so as to acquire a second service path identifier, where the first path switching entry includes a correspondence between the first processing result, the first service path identifier, and the second service path identifier; and send a third packet to the central switching device, where a source device identifier of the third packet is the device identifier of the first service atom, a second service packet is encapsulated in the third packet, the second service packet includes all or a part of a payload of the first service packet, and the third packet includes the second service path identifier.

Preferably, the central switching device 2120 is further configured to: receive the third packet sent by the first service atom, where the third packet includes the second service path identifier and the second service packet is further encapsulated in the third packet, where the second service packet includes a part of a payload of the first service packet, all of a payload of the first service packet, or the first service packet; query a second service route forwarding entry according to the second service path identifier and the source device identifier of the third packet, so as to acquire a device identifier of the second service atom 2140, where the second service route forwarding entry includes a correspondence between the source device identifier of the third packet, the second service path identifier, and the device identifier of the second service atom; and send a fourth packet to the second service atom 2140, where the second service packet is encapsulated in the fourth packet and the fourth packet further includes the second service path identifier.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

Embodiment 13

Figure 22:
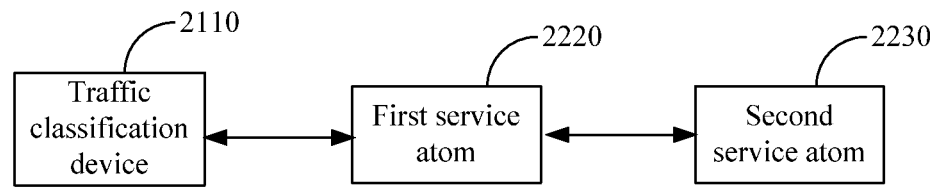
FIG. 22 is a schematic structural diagram of a service processing system according to an embodiment of the present invention.

This embodiment of the present invention further provides a service processing system. As shown in FIG. 22, the service processing system includes a traffic classification device 2210, a first service atom 2220, and a second service atom 2230, where: the traffic classification device 2210 is configured to receive a first service packet; acquire a first service identifier, where the first service identifier is a service identifier of the first service packet; query a first traffic classification entry according to the first service identifier, so as to acquire a first service path identifier and a device identifier of the first service atom, where the first traffic classification entry includes a correspondence between the first service identifier, the first service path identifier, and the device identifier of the first service atom; encapsulate the first service packet to obtain a first packet, where the first packet includes the first service path identifier and a source device identifier of the first packet, and the source device identifier of the first packet includes a device identifier of the traffic classification device; and send the first packet to the first service atom; and the first service atom 2220 is configured to receive the first packet, where the first service packet is encapsulated in the first packet and the first packet further includes the first service path identifier; perform first service processing according to information in the first service packet, to obtain a first processing result; query a first path switching entry according to the source device identifier of the first packet, the first processing result, and the first service path identifier, so as to acquire a second service path identifier and a device identifier of the second service atom 2230, where the first path switching entry includes a correspondence between the source device identifier of the first packet, the first processing result, the first service path identifier, the second service path identifier, and the device identifier of the second service atom; and send a second packet to the second service atom 2230, where a source device identifier of the second packet is the device identifier of the first service atom 2220, a second service packet is encapsulated in the second packet, and the second service packet includes the second service path identifier, where the second service packet includes a part of a payload of the first service packet, all of a payload of the first service packet, or the first service packet.

In this embodiment of the present invention, a service atom performs service processing according to information in a service packet to obtain a processing result, and determines a subsequent service path according to the processing result. In this way, service path switching can be implemented in a service routing process and a service processing system can process a branch-type service, thereby expanding a scope of a service that can be processed by a service processing system formed by multiple service atoms.

It should be noted that, when service packet processing forwarding apparatuses in the foregoing embodiments perform service packet processing forwarding, division of the foregoing functional modules is merely used as an example for description, and in an actual application, the foregoing functions may be allocated to and implemented by different functional modules according to a requirement, that is, an internal structure of the apparatus is divided into different functional modules to implement all or a part of the functions described above. In addition, the service packet processing forwarding apparatuses, and the service packet processing forwarding methods in the foregoing embodiments are based on a same idea. For specific implementation processes of the apparatuses and methods, reference may be made to the method embodiments, and details are not described herein again.

The sequence numbers of the foregoing embodiments of the present invention are merely used for description, and do not represent the preference of the embodiments.

A person of ordinary skill in the art may understand that all or a part of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A central switching device comprising:
    a processor;
    a memory; and
    an input/output circuit, wherein the processor is coupled to the memory and connected to the input/output circuit;
    wherein the processor is configured to:
        receive a first packet with the input/output circuit, wherein the first packet comprises a first service packet and a first internal header, wherein the first service packet is encapsulated with the first internal header, and wherein the first internal header comprises a first service path identifier, a source device identifier of the first packet, and a destination device identifier of the first packet, wherein the destination device identifier of the first packet is a device identifier of the central switching device;
        query a first service route forwarding entry according to the source device identifier of the first packet and the first service path identifier to acquire a device identifier of a first service atom, wherein the first service route forwarding entry comprises a correspondence among the source device identifier of the first packet, the first service path identifier, and the device identifier of the first service atom;
        re-encapsulate the first service packet with a second internal header to obtain a second packet, wherein the second internal header comprises the first service path identifier, a source device identifier of the second packet, and a destination device identifier of the second packet, wherein the source device identifier of the second packet is a device identifier of the central switching device, wherein the source device identifier of the second packet and the source device identifier of the first packet are different, and wherein the destination device identifier of the second packet is the device identifier of the first service atom;
        send the second packet to the first service atom with the input/output circuit; and
        receive a third packet sent by the first service atom, wherein the third packet comprises a second service path identifier, and a second service packet is encapsulated in the third packet, wherein the second service packet comprises at least a part of a payload of the first service packet, and wherein the second service path identifier is obtained by the first service atom according to the first service path identifier.

2. The central switching device according to claim 1, wherein the source device identifier of the first packet comprises a device identifier of a traffic classification device.

3. The central switching device according to claim 2, wherein the processor is further configured to:
    query a second service route forwarding entry according to the second service path identifier and a source device identifier of the third packet, so as to acquire a device identifier of a second service atom, wherein the second service route forwarding entry comprises a correspondence among the source device identifier of the third packet, the second service path identifier, and the device identifier of the second service atom; and
    send a fourth packet to the second service atom, wherein the second service packet is encapsulated in the fourth packet and the fourth packet further comprises the second service path identifier.

4. The central switching device according to claim 1, wherein the processor is further configured to:
    query a second service route forwarding entry according to the second service path identifier and a source device identifier of the third packet, so as to acquire a device identifier of a second service atom, wherein the second service route forwarding entry comprises a correspondence among the source device identifier of the third packet, the second service path identifier, and the device identifier of the second service atom; and
    send a fourth packet to the second service atom, wherein the second service packet is encapsulated in the fourth packet and the fourth packet further comprises the second service path identifier.

5. A service processing system, comprising:

a traffic classification device comprising a first processor, a first memory, and a first input/output circuit, wherein the first processor is coupled to the first memory and connected to the first input/output circuit, and the first processor is configured to:
  receive a first service packet with the first input/output circuit;
  acquire a first service identifier of the first service packet, wherein the first service identifier identifies a service to be processed;
  query a first traffic classification entry according to the first service identifier, so as to acquire a first service path identifier, wherein the first traffic classification entry comprises a correspondence between the first service identifier and the first service path identifier;
  encapsulate the first service packet with a first internal header to obtain a first packet, wherein the first internal header comprises the first service path identifier, a first source device identifier, and a destination device identifier, wherein the first source device identifier comprises a device identifier of the traffic classification device, wherein the destination device identifier of the first packet is a device identifier of a central switching device; and
  send the first packet to the central switching device with the first input/output circuit; and the central switching device, comprising a second processor, a second memory, and a second input/output circuit, wherein the second processor is coupled to the second memory and connected to the second input/output circuit, and the second processor is configured to:
  receive the first packet with the second input/output circuit;
  query a first service route forwarding entry according to the first source device identifier of the first packet and the first service path identifier, so as to acquire a device identifier of a first service atom, wherein the first service route forwarding entry comprises a correspondence among the first source device identifier of the first packet, the first service path identifier, and the device identifier of the first service atom;
  re-encapsulate the first service packet with a second internal header to obtain a second packet, wherein the second internal header comprises the first service path identifier, a second source device identifier, and a second destination device identifier, wherein the second source device identifier comprises a device identifier of the central switching device, wherein the second source device identifier and the first source device identifier are different, wherein the second destination device identifier is the device identifier of the first service atom;
  send the second packet to the first service atom with the second input/output circuit; and
  receive a third packet sent by the first service atom, wherein the third packet comprises a second service path identifier and a second service packet encapsulated in the third packet, wherein the second service packet comprises at least a part of a payload of the first service packet, and wherein the second service path identifier is obtained by the first service atom according to the first service path identifier.

6. The service processing system according to claim 5, wherein the second processor is further configured to:
  query a second service route forwarding entry according to the second service path identifier and a source device identifier of the third packet, so as to acquire a device identifier of a second service atom, wherein the second service route forwarding entry comprises a correspondence among the source device identifier of the third packet, the second service path identifier, and the device identifier of the second service atom; and
  send a fourth packet to the second service atom, wherein the second service packet is encapsulated in the fourth packet and the fourth packet further comprises the second service path identifier.

7. The service processing system according to claim 5, wherein the third packet comprises the second service packet encapsulated with a third internal header, and wherein the third internal header comprises the second service path identifier and the source device identifier of the third packet; and
  wherein the second processor is further configured to:
    query a second service route forwarding entry according to the second service path identifier and the source device identifier of the third packet, so as to acquire a device identifier of a second service atom, wherein the second service route forwarding entry comprises a correspondence among the source device identifier of the third packet, the second service path identifier, and the device identifier of the second service atom;
    re-encapsulate the second service packet with a fourth internal header to obtain a fourth packet, wherein the fourth internal header comprises the second service path identifier and a source device identifier of the fourth packet; and
    send the fourth packet to the second service atom.

8. The central switching device according to claim 1, wherein the source device identifier of the second packet comprises a device identifier of the central switching device.

9. The central switching device according to claim 1, wherein the source device identifier of the first packet comprises a device identifier of a service atom.

10. The central switching device according to claim 9, wherein the processor is further configured to:
  query a second service route forwarding entry according to the second service path identifier and a source device identifier of the third packet, so as to acquire a device identifier of a second service atom, wherein the second service route forwarding entry comprises a correspondence among the source device identifier of the third packet, the second service path identifier, and the device identifier of the second service atom; and
  send a fourth packet to the second service atom, wherein the second service packet is encapsulated in the fourth packet and the fourth packet further comprises the second service path identifier.

11. The central switching device according to claim 1, wherein the second service packet comprises all of the payload of the first service packet.

12. The central switching device according to claim 1, wherein the second service packet comprises the entire first service packet.

13. The service processing system according to claim 5, wherein the second service packet comprises all of the payload of the first service packet.

14. The service processing system according to claim 5, wherein the second service packet comprises the entire first service packet.

15. A method, comprising:
   receiving, by a central switching device, a first packet, wherein the first packet comprises a first service packet and a first internal header, wherein the first service packet is encapsulated with the first internal header, and wherein the first internal header comprises a first service path identifier, a source device identifier of the first packet, and a destination device identifier of the first packet, wherein the destination device identifier of the first packet is a device identifier of the central switching device;
   querying, by the central switching device, a first service route forwarding entry according to the source device identifier of the first packet and the first service path identifier to acquire a device identifier of a first service atom, wherein the first service route forwarding entry comprises a correspondence among the source device identifier of the first packet, the first service path identifier, and the device identifier of the first service atom;
   re-encapsulating, by the central switching device, the first service packet with a second internal header to obtain a second packet, wherein the second internal header comprises the first service path identifier, a source device identifier of the second packet, and a destination device identifier of the second packet, wherein the source device identifier of the second packet is a device identifier of the central switching device, wherein the source device identifier of the second packet and the source device identifier of the first packet are different, and wherein the destination device identifier of the second packet is the device identifier of the first service atom;
   sending, by the central switching device, the second packet to the first service atom; and
   receiving, by the central switching device, a third packet sent by the first service atom, wherein the third packet comprises a second service path identifier, and a second service packet is encapsulated in the third packet, wherein the second service packet comprises at least a part of a payload of the first service packet, and wherein the second service path identifier is obtained by the first service atom according to the first service path identifier.

16. The method according to claim 15, wherein the source device identifier of the first packet comprises a device identifier of a traffic classification device.

17. The method according to claim 16, further comprising:
   querying, by the central switching device, a second service route forwarding entry according to the second service path identifier and a source device identifier of the third packet, to acquire a device identifier of a second service atom, wherein the second service route forwarding entry comprises a correspondence among the source device identifier of the third packet, the second service path identifier, and the device identifier of the second service atom; and
   sending, by the central switching device, a fourth packet to the second service atom, wherein the second service packet is encapsulated in the fourth packet and the fourth packet further comprises the second service path identifier.

* * * * *